(12) United States Patent
Wada et al.

(10) Patent No.: US 8,684,523 B2
(45) Date of Patent: Apr. 1, 2014

(54) SPECTACLE LENS, SPECTACLE LENS DESIGN METHOD, AND DESIGN APPARATUS

(75) Inventors: Osamu Wada, Ina (JP); Tadashi Kaga, Minowa-machi (JP); Hiroshi Asami, Minowa-machi (JP)

(73) Assignee: Hoya Lens Manufacturing Philippines Inc., Cavite (PH)

( * ) Notice: Subject to any disclaimer, the term of this patent is extended or adjusted under 35 U.S.C. 154(b) by 60 days.

(21) Appl. No.: 13/452,511

(22) Filed: Apr. 20, 2012

(65) Prior Publication Data

US 2012/0274893 A1    Nov. 1, 2012

(30) Foreign Application Priority Data

Apr. 28, 2011   (JP) .................. 2011-100847

(51) Int. Cl.
    *G02C 7/02*       (2006.01)
(52) U.S. Cl.
    USPC ............ 351/159.42; 351/159.73; 351/159.74; 351/159.75
(58) Field of Classification Search
    USPC ............ 351/159.07, 159.22, 159.42, 159.46, 351/159.52, 159.73, 159.76, 159.77
    See application file for complete search history.

(56) References Cited

U.S. PATENT DOCUMENTS

| | | | |
|---|---|---|---|
| 5,033,839 A | 7/1991 | Bonbon et al. | |
| 5,148,205 A | 9/1992 | Guilino et al. | |
| 5,608,471 A * | 3/1997 | Miller | 351/159.41 |
| 6,142,625 A * | 11/2000 | Sawano et al. | 351/159.07 |
| 2008/0231800 A1 | 9/2008 | Esser et al. | |
| 2009/0257026 A1 | 10/2009 | Varnas et al. | |
| 2010/0149492 A1 | 6/2010 | Allione et al. | |
| 2010/0296048 A1 | 11/2010 | Weatherby | 351/159 |
| 2012/0016644 A1 | 1/2012 | De Rossi et al. | |

FOREIGN PATENT DOCUMENTS

| | | |
|---|---|---|
| EP | 0340090 A1 | 11/1989 |
| EP | 0347917 A1 | 12/1989 |
| EP | 2207118 A1 | 7/2010 |
| FR | 2910645 A1 | 6/2008 |
| JP | 2003-215507 | 7/2003 |
| JP | 2008-249828 | 10/2008 |
| JP | 2010-271702 | 12/2010 |
| WO | 2005085937 A1 | 9/2005 |
| WO | 2007041796 A1 | 4/2007 |

OTHER PUBLICATIONS

Extended European search report dated Aug. 1, 2012 issued in corresponding European application 12165674.8.

* cited by examiner

*Primary Examiner* — Evelyn A Lester
*Assistant Examiner* — William Alexander
(74) *Attorney, Agent, or Firm* — DLA Piper LLP (US)

(57) ABSTRACT

A spectacle lens includes a first region which is located in at least part of a portion of a lens where a pivotal angle of an eyeball of a wearer ranges from 20 to 60 degrees and in which correcting astigmatism has priority over correcting average power based on prescribed power, and a second region which is formed inside the first region and in which correcting the average power has priority over correcting the astigmatism.

10 Claims, 21 Drawing Sheets

| | | PERFORMANCE PRIORITY (DESIGN) | APPEARANCE PRIORITY (DESIGN) |
|---|---|---|---|
| PERFORMANCE IN USE | CLEARNESS | ○ | ○ |
| | WEIGHT | HEAVY | LIGHT |
| | DISTORTION (RECOGNIZED BY WEARER) | SMALL | LARGE |
| | TOTAL SCORE | ○ | △ |
| EXTERNAL APPEARANCE | CURVE | STEEP | SHALLOW |
| | THICKNESS | △ | ○ |
| | DISTORTION (RECOGNIZED BY PERSON WHO LOOKS AT WEARER) | LARGE | SMALL |
| | TOTAL SCORE | △ | ○ |

SPECTACLE LENS, SPECTACLE LENS DESIGN METHOD, AND DESIGN APPARATUS

This application claims priority to Japanese Patent Application No. 2011-100847, filed Apr. 28, 2011, the entirety of which is hereby incorporated by reference.

BACKGROUND

1. Technical Field

The present invention relates to a spectacle lens, a spectacle lens design method, and a design apparatus.

2. Related Art

Correcting average power with respect to prescribed power, that is, reducing an average power error, and reducing astigmatism are at least two essential requirements to design a spectacle lens that provides a clear field of view. For example, JP-A-2003-215507 describes providing a spectacle lens having a shallow base curve and capable of suppressing not only an average power error and astigmatism but also distortion. The spectacle lens described in JP-A-2003-215507 has a spherical outer surface and a rotationally symmetric aspherical inner surface. Further, an average power error and astigmatism are primarily corrected in a central portion where the viewing angle ranges from 0 to 30 degrees, and distortion is primarily corrected in a peripheral portion. When an object is viewed through the lens described above, a clear image is provided across the range over which the eyeball moves and a distortion-corrected image is formed in a peripheral portion of the retinal, whereby the wearer enjoys a satisfactory field of view. JP-A-2003-215507 describes that an average power error, astigmatism, and distortion are not necessarily corrected across the lens but the weighted aberration correction described above ensures satisfactory optical performance recognizable by the wearer, whereby satisfactory optical performance is achieved and a shallow base curve for reducing the thickness of the lens can be employed at the same time.

The spectacle lens described in JP-A-2003-215507, which provides a clear image through the central portion of the lens, however, has a disadvantage of insufficient astigmatism correction in the peripheral portion of the lens, which can result in a distorted, unclear image formed through the peripheral portion. The distortion of an image formed through the peripheral portion may reduce performance in use and make the lens less fashionable, for example, may distort the contour of the face of the wearer (person who wears eyeglasses) viewed through the lens.

Eyeglasses are not only an important medical tool that aids vision but also an important fashion item on which the impression of the wearer depends. It is therefore desired to develop eyeglasses and a spectacle lens that are easy to use and highly fashionable.

SUMMARY

An aspect of the invention relates to a spectacle lens including a first region which is located in at least part of a portion of the lens where a pivotal angle of an eyeball of a wearer ranges from 20 to 60 degrees and in which correcting astigmatism has priority over correcting average power based on prescribed power and a second region which is formed inside the first region and in which correcting the average power has priority over correcting the astigmatism.

The spectacle lens according to the aspect includes a first region which is located in at least part of a portion where the pivotal angle ranges from 20 to 60 degrees and in which astigmatism is well corrected but instead a certain amount of error of average power is allowed to be present. When priority is placed on correcting the average power in a region where the pivotal angle is large, astigmatism cannot be well corrected when the pivotal angle increases. It is therefore difficult to provide a clear image when a distant object is viewed through a region where the pivotal angle is large. However, accepting a certain amount of error of the average power in a region where the pivotal angle is large allows astigmatism to be readily corrected to zero or a value in the vicinity thereof, whereby an image reasonably clear and having a small amount of distortion can be provided when a distance object is viewed. Further, accepting a certain amount of error of the average power in a region where the pivotal angle is large allows the shape of the outer surface (base curve) of the spectacle lens and/or the shape of the inner surface thereof to be selected from a greater number of candidates than in a case where no error of the average power is allowed. The resultant spectacle lens can therefore be easier to use and more fashionable.

The first region desirably includes a point where the value of the astigmatism (astigmatism) is a local minimum having a negative value and a point where the value of the astigmatism is a local maximum having a positive value. When the astigmatism changes in such a way that it experiences a negative local maximum and a positive local maximum in the first region, the astigmatism oscillates around zero in the first region, where the pivotal angle is large, whereby the astigmatism will not greatly diverge from zero.

The first region desirably includes a region where the value of meridional dioptric power (meridional dioptric power) and the value of sagittal dioptric power (sagittal dioptric power) change in such a way that the value of the meridional dioptric power and the value of the sagittal dioptric power approach each other, intersect each other, and then approach each other again as the pivotal angle increases. Designing the spectacle lens in such a way that the meridional dioptric power and the sagittal dioptric power approach each other allows the astigmatism to approach zero. In this case, the astigmatism in the first region, where the pivotal angle is large, oscillates around zero, whereby the resultant spectacle lens can provide a clearer image in a region where the pivotal angle is large.

A maximum error of the average power of the lens with respect to from the prescribed power in the first region is desirably 30% or smaller. In this way, an error of the average power will not be too large, whereby the resultant spectacle lens can provide a clearer image in the first region, where the pivotal angle is large.

The second region, where correcting the average power has priority over correcting the astigmatism, desirably includes a region where the value of meridional dioptric power and the value of sagittal dioptric power change in such a way that the value of the meridional dioptric power and the value of the sagittal dioptric power deviate from other as the pivotal angle increases. Since the average power is the average of the meridional dioptric power and the sagittal dioptric power, variation in the average power in the second region, which is a central portion of the spectacle lens, can therefore be suppressed. The resultant spectacle lens therefore provides the following advantages: correcting the average power has priority over correcting the astigmatism; the average power error is small; and the average power in the central portion agrees with the prescribed power or is close thereto.

In the spectacle lens, when the prescribed power is negative and the absolute value thereof is greater, a smaller design diameter of the second region is desirably set. When the prescribed power is negative, the pivotal angle is smaller than the viewing angle, whereby the viewing angle is wide enough even when the second region is small. In general, the more prescribed power is negative, the thicker the resultant spectacle lens tends to be. In view of the fact, when the absolute value of the prescribed power is large, providing a wide first region where astigmatism is well corrected allows a more highly fashionable spectacle lens to be provided without any degradation in ease of use as a spectacle lens.

When the prescriptions of the spectacle lens include astigmatism correction by specifying negative dioptric power, the second region desirably has an elliptical design shape. In prescriptions of astigmatism correction, dioptric power varies for each cylinder axis, which means that the pivotal angle differs from the viewing angle for each cylinder axis. Employing an elliptical design shape of the second region therefore allows the size of the first region to be further increased, whereby a more highly fashionable spectacle lens can be provided without any degradation in ease of use as a spectacle lens including astigmatism correction.

Another aspect of the invention relates to eyeglasses including a spectacle lens having a first region which is located in at least part of a portion where a pivotal angle of an eyeball of a wearer ranges from 20 to 60 degrees and in which correcting astigmatism has priority over correcting average power based on prescribed power and a second region which is formed inside the first region and in which correcting the average power has priority over correcting the astigmatism, and an eyeglass frame to which the spectacle lens is attached on both sides. Employing the spectacle lens to form eyeglasses allows highly fashionable eyeglasses that are easier to use than those of related art to be provided.

Another aspect of the invention relates to a spectacle lens design method including providing a first region which is located in a portion of the lens where a pivotal angle of an eyeball of a wearer ranges from 20 to 60 degrees and in which correcting astigmatism has priority over correcting average power based on prescribed power and providing a second region which is located inside the first region and in which correcting the average power has priority over correcting the astigmatism. The method allows a highly fashionable spectacle lens that is easy to use and capable of providing a clear image through the first region, where the pivotal angle is large, to be designed and provided.

The providing the second region in the spectacle lens design method desirably includes setting a smaller design diameter of the second region when the prescribed power is negative and the absolute value of the prescribed power is greater. The provision of the second region desirably includes using an elliptical design shape of the second region when the prescriptions of the spectacle lens include astigmatism correction by specifying negative dioptric power.

Another aspect of the invention relates to a spectacle lens design apparatus. The apparatus (design apparatus) includes a unit (functional unit) that acquires eyeglass specifications including prescribed power, a first unit (first region design unit, first functional unit) that designs a first region which is located in at least part of a portion of the lens where a pivotal angle of an eyeball of a wearer ranges from 20 to 60 degrees and in which correcting astigmatism has priority over correcting average power based on the prescribed power, and a second unit (second region design unit, second functional unit) that designs a second region which is located inside the first region and in which correcting the average power has priority over correcting the astigmatism. The design apparatus can design a fashionable spectacle lens that a wearer (user) can easily use.

The second unit desirably includes a unit that sets a smaller design diameter of the second region when the prescribed power is negative and the absolute value of the prescribed power is greater, and sets a fixed design diameter of the second region irrespective of the prescribed power when the prescribed power is positive.

The apparatus desirably further includes an evaluation unit that evaluates the designed spectacle lens when a user views an object therethrough and when the user is viewed therethrough. Evaluating the spectacle lens when the user uses it and when the user is viewed therethrough allows a spectacle lens that is further fashionable and has higher performance in use to be designed.

BRIEF DESCRIPTION OF THE DRAWINGS

The invention will be described with reference to the accompanying drawings, wherein like numbers reference like elements.

FIGS. 3A to 3I describe distortion recognized by other people who view a person who wears eyeglasses.

FIG. 15B shows characteristics in a 180- degree direction including a power error and astigmatism of the lens according to Example 3.

Figure 16:
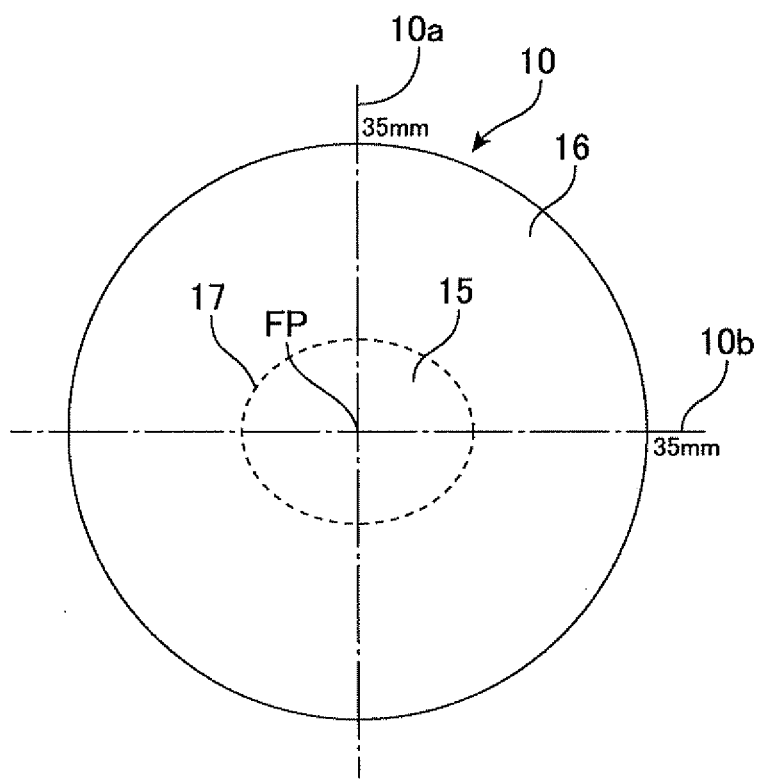

FIG. 16 shows an elliptical comfort zone.

Figure 17A:
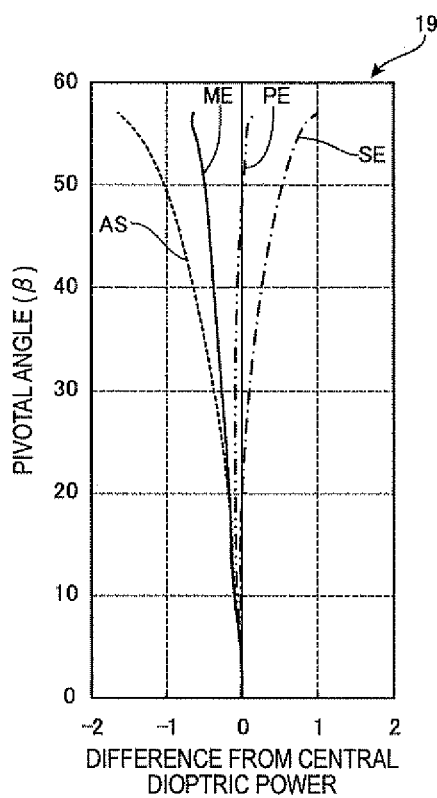
Figure 17B:
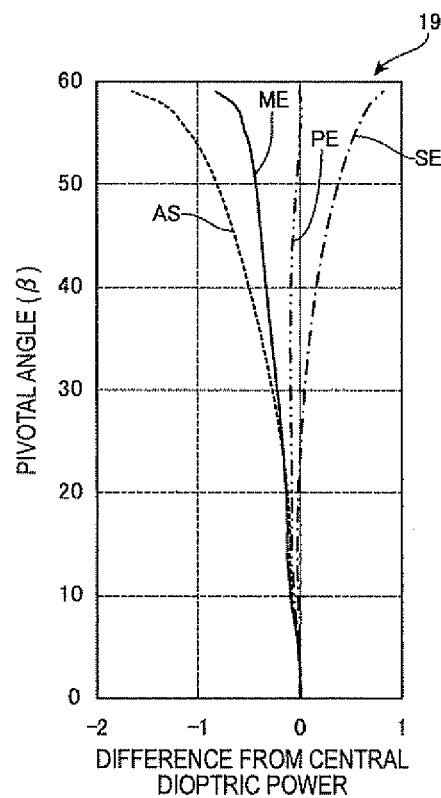

FIG. 17A shows characteristics in a 90-degree direction including a power error and astigmatism of a lens according to Comparative Example 3, and FIG. 17B shows characteristics in a 180-degree direction including a power error and astigmatism of the lens according to Comparative Example 3.

Figure 18A:
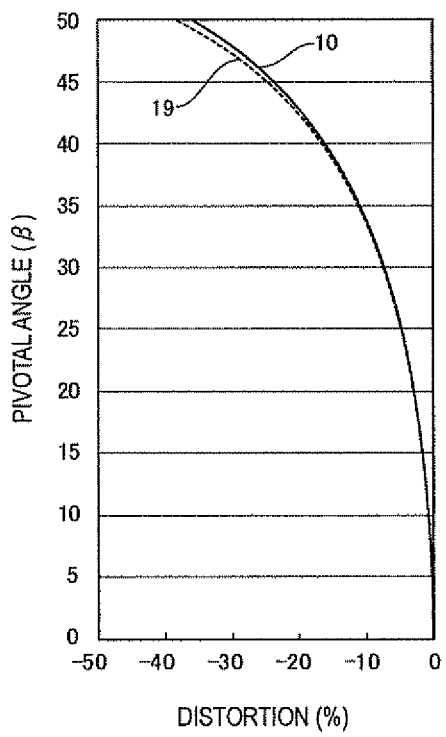
Figure 18B:
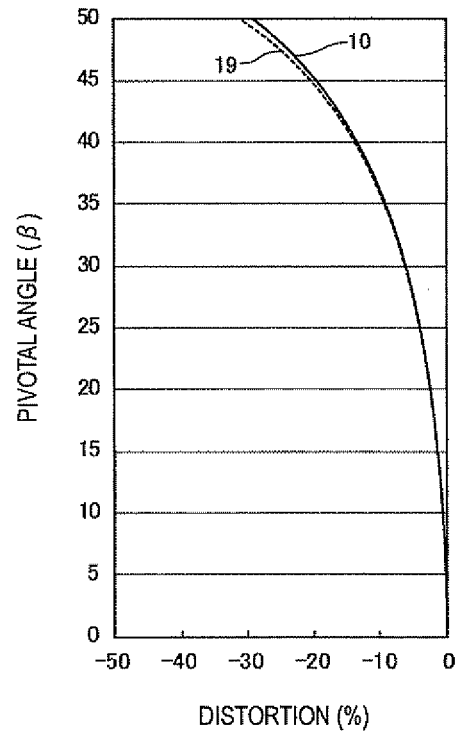

FIG. 18A shows distortion of the lens according to Example 3 in the 90-degree direction, and FIG. 18B shows distortion of the lens according to Example 3 in the 180-degree direction.

Figure 19A:
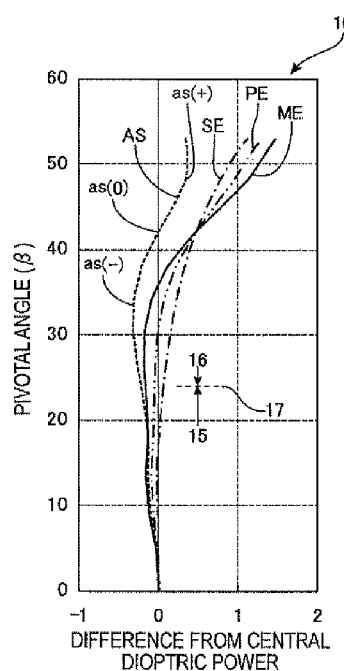
Figure 19B:
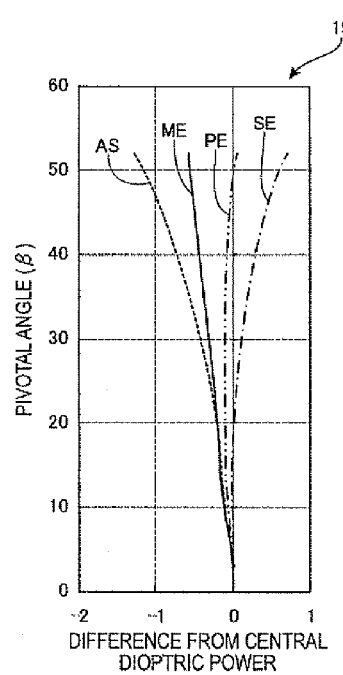
Figure 19C:
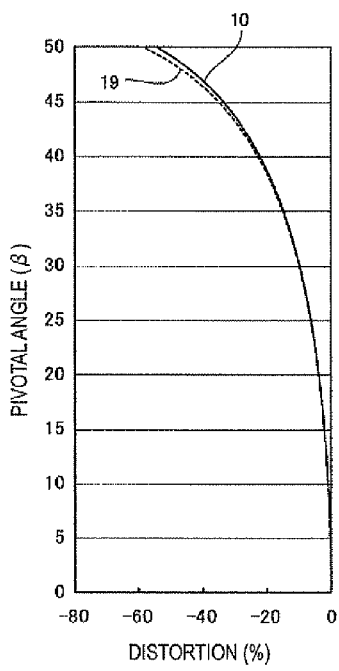

FIG. 19A shows characteristics including a power error and astigmatism of a lens according to Example 4, FIG. 19B shows characteristics including a power error and astigmatism of a lens according to Comparative Example 4, and FIG. 19C show distortion.

Figure 20A:
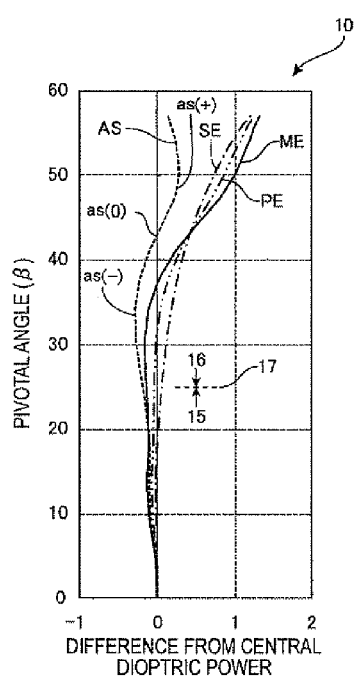
Figure 20B:
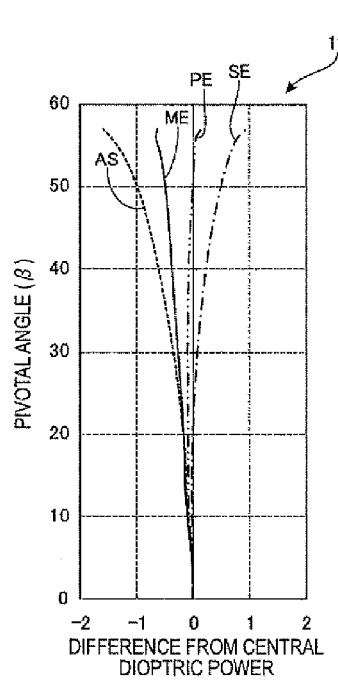
Figure 20C:
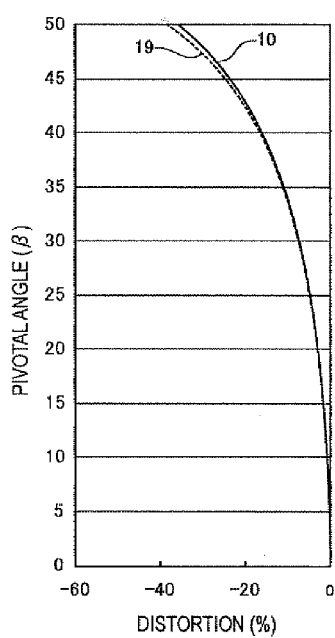

FIG. 20A shows characteristics including a power error and astigmatism of a lens according to Example 5, FIG. 20B shows characteristics including a power error and astigmatism of a lens according to Comparative Example 5, and FIG. 20C show distortion.

Figure 21A:
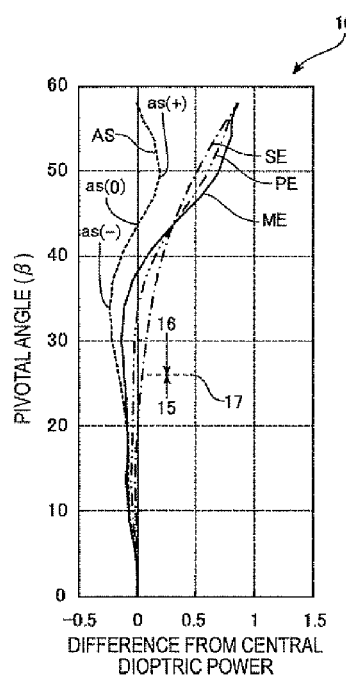
Figure 21B:
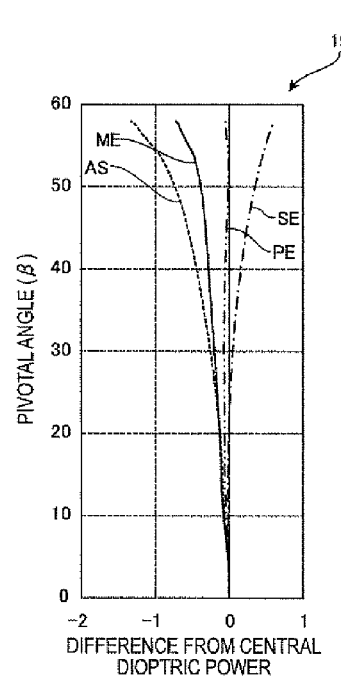
Figure 21C:
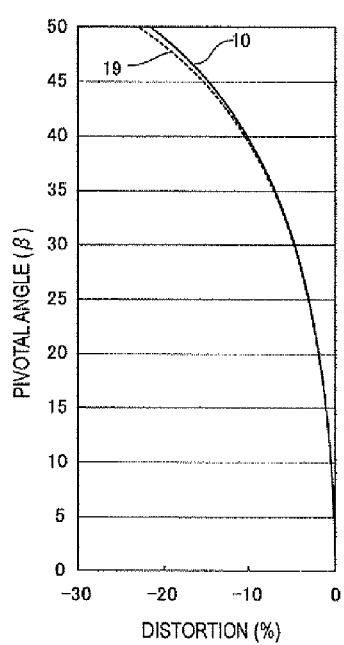

FIG. 21A shows characteristics including a power error and astigmatism of a lens according to Example 6, FIG. 21B shows characteristics including a power error and astigmatism of a lens according to Comparative Example 6, and FIG. 21C show distortion.

Figure 22A:
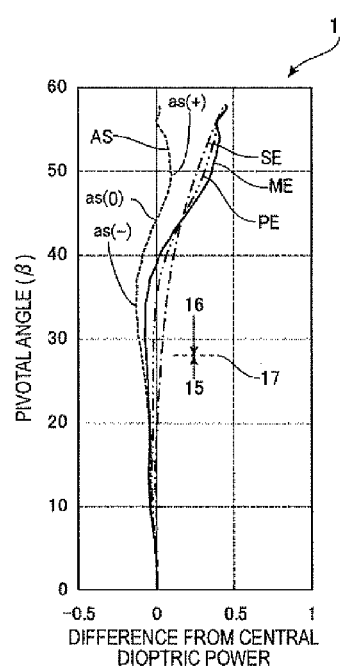
Figure 22B:
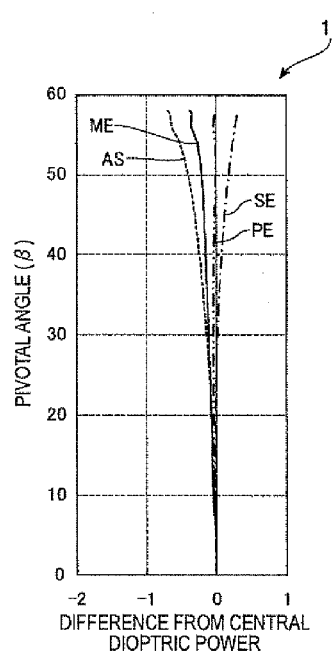
Figure 22C:
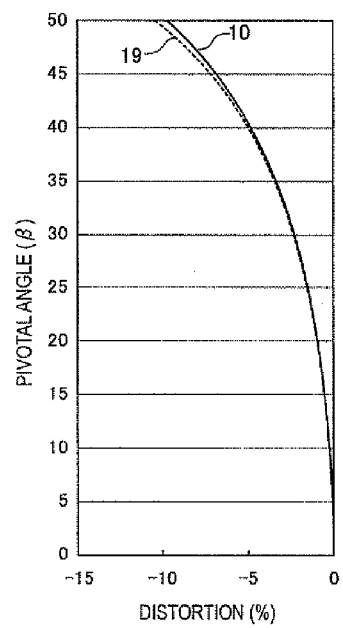

FIG. 22A shows characteristics including a power error and astigmatism of a lens according to Example 7, FIG. 22B shows characteristics including a power error and astigmatism of a lens according to Comparative Example 7, and FIG. 22C show distortion.

Figure 23A:
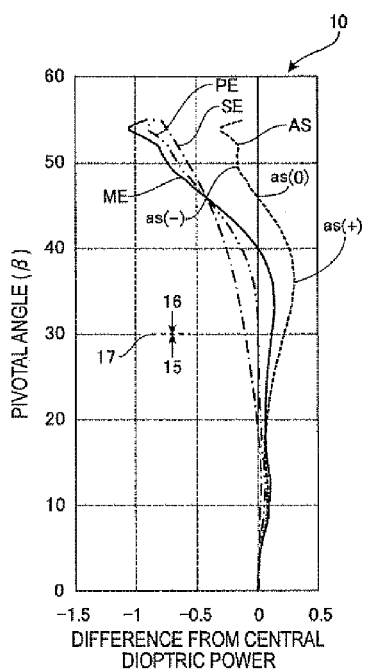
Figure 23B:
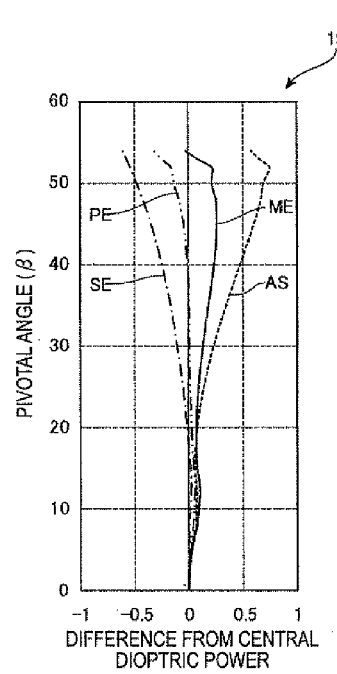
Figure 23C:
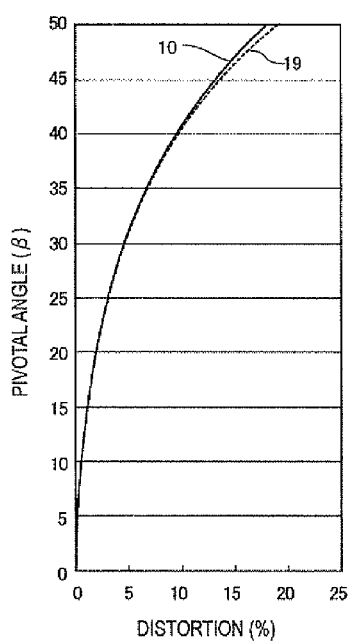

FIG. 23A shows characteristics including a power error and astigmatism of a lens according to Example 8, FIG. 23B shows characteristics including a power error and astigmatism of a lens according to Comparative Example 8, and FIG. 23C show distortion.

Figure 24A:
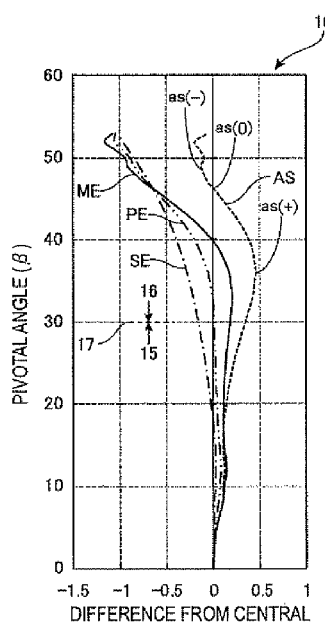
Figure 24B:
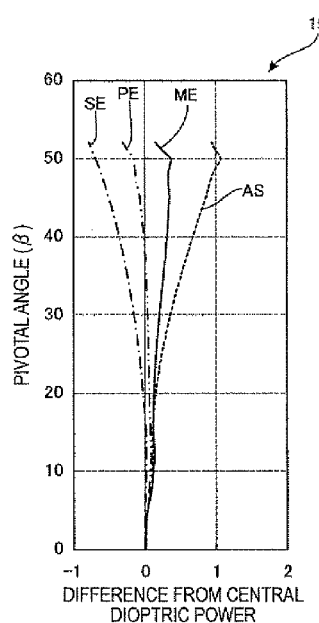
Figure 24C:
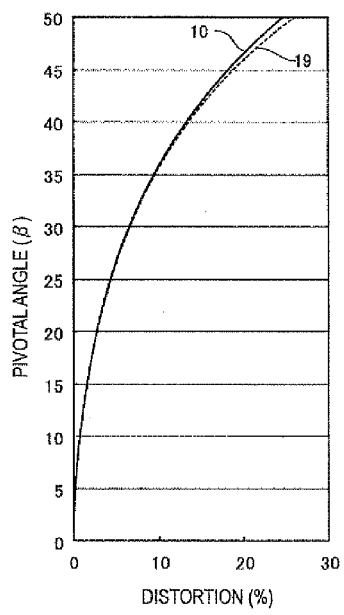

FIG. 24A shows characteristics including a power error and astigmatism of a lens according to Example 9, FIG. 24B shows characteristics including a power error and astigmatism of a lens according to Comparative Example 9, and FIG. 24C show distortion.

Figure 25:
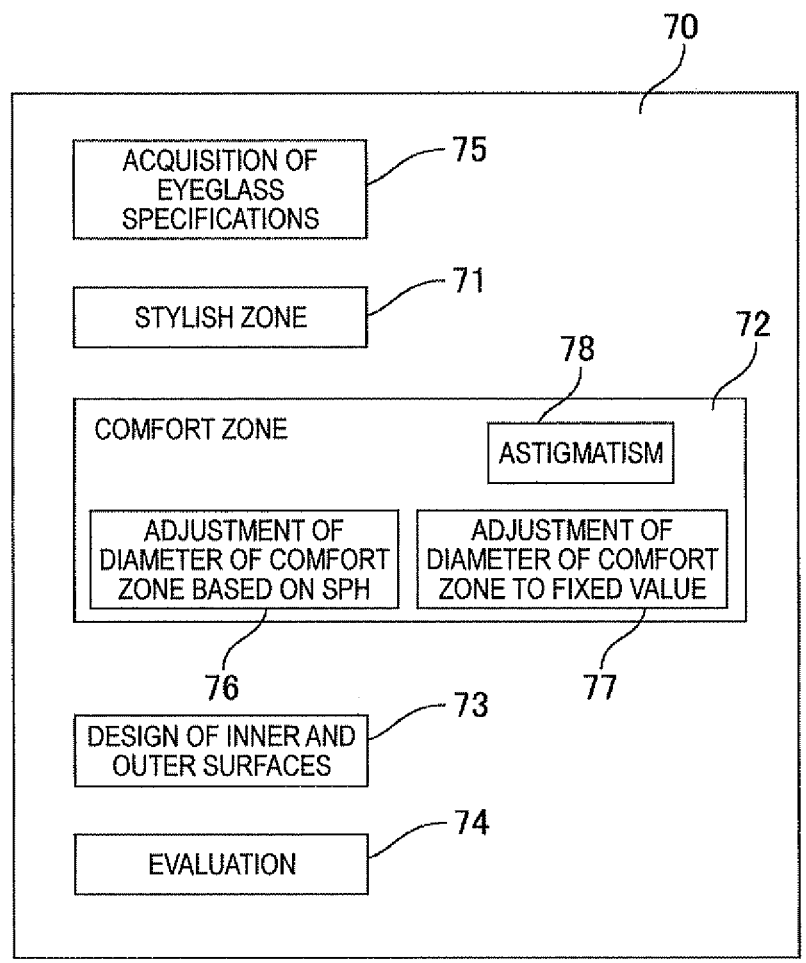

FIG. 25 is a block diagram showing a primary configuration of a design apparatus.

DESCRIPTION OF EXEMPLARY EMBODIMENTS

Figures 1A, 1B:
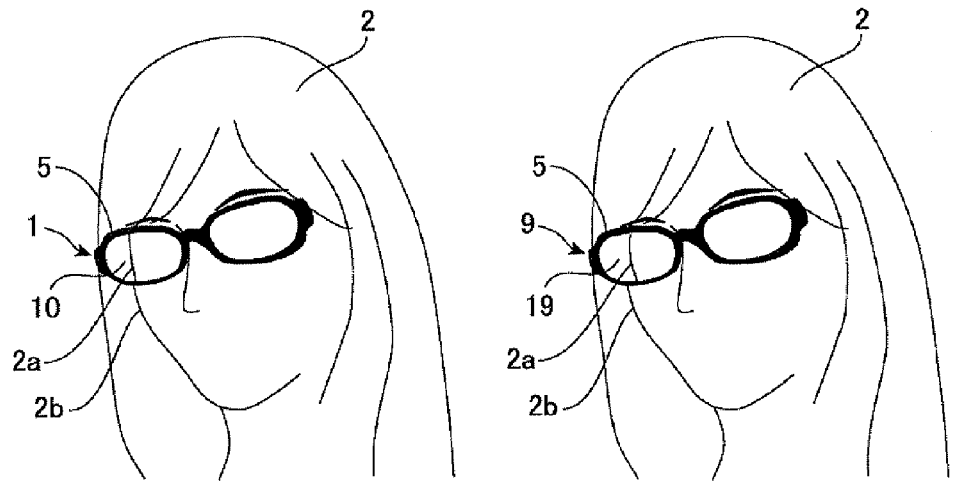
FIG. 1A shows a user who wears eyeglasses according to an embodiment.
FIG. 1B shows the user who wears eyeglasses according to a comparative embodiment.

FIGS. 1A and 1B show a user who wears eyeglasses (wearer). FIG. 1A shows a user 2 who wears eyeglasses 1 having spectacle lenses 10 according to an embodiment of the invention attached to a frame (eyeglass frame) 5, and FIG. 1B shows the user 2 who wears eyeglasses 9 having spectacle lenses 19 (typical single-focus lens) according to a comparative embodiment attached to the frame 5. In the eyeglasses 9 shown in FIG. 1B, a portion 2a of the face contour of the user 2 viewed through a peripheral portion of one of the spectacle lenses 19 greatly deviates from another portion 2b of the face contour due to aberrations produced in the peripheral portion of the spectacle lens 19. On the other hand, in the eyeglasses 1 shown in FIG. 1A, the portion 2a of the face contour of the user 2 viewed through a peripheral portion of one of the spectacle lenses 10 deviates very little from the other portion 2b. The eyeglasses 1 are therefore stylish eyeglasses that allow the wearer 2 to be viewed more naturally through the spectacle lenses 10 (allow other people to see the wearer 2 more naturally).

Eyeglasses are not only an important medical tool that aids vision but also an important fashion item on which the impression of the individual user depends, as described above. That is, eyeglasses are not only required to have adequate dioptric power as a medical tool and an easy-to-use design but also desired to have a thinnest possible lens as a fashion item, allow the wearer to be viewed (through lens) "naturally", and reflect a user's desire. Recent eyeglasses therefore need to have not only satisfactory performance in use but also a stylish external appearance.

Figure 2:
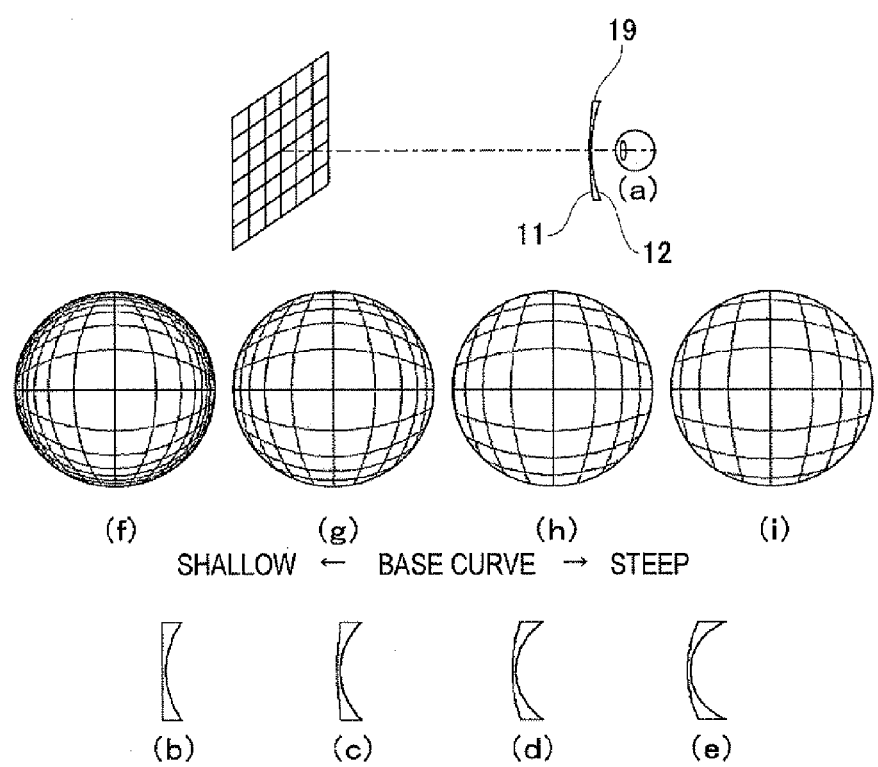
FIGS. 2A to 2I describe distortion recognized by a person who views an object through eyeglasses.

FIGS. 2A to 2I show how the base curve changes distortion recognized by a person who wears eyeglasses. FIGS. 3A to 3I show how the base curve changes distortion recognized by other people who view a person who wears eyeglasses. FIGS. 2A to 2I and FIGS. 3A to 3I show distortion produced by the single-focus lens 19 according to the comparative embodiment, which has a prescribed power SPH of −4.0 (diopter, hereinafter referred to as "D"). The distortion shown in FIGS. 2A to 2I is produced when a person views a grid pattern through the single-focus lens 19 from the side where the inner surface 12 of the lens 19 is present, as shown in FIG. 2A. The distortion becomes smaller as shown in FIGS. 2F to 2I as the base curve (surface power of outer surface 11) becomes steeper as shown in FIGS. 2B to 2E, and the resultant lens has satisfactory optical performance and allows a wearer to view an object naturally.

The distortion shown in FIGS. 3A to 3I is produced when a person views the grid pattern through the single-focus lens 19 from the side where the outer surface 11 of the lens 19 is present, as shown in FIG. 3A. The distortion becomes greater as shown in FIGS. 3F to 3I as the base curve (surface power of outer surface 11) becomes steeper as shown in FIGS. 3B to 3E. A lens having a shallower base curve therefore allows the wearer who wears the lens to be viewed more naturally therethrough. As described above, performance of eyeglasses evaluated by the wearer 2 who views an object through the eyeglasses differs from performance of the eyeglasses evaluated by a person who views the wearer 2 who wears the eyeglasses.

Figures 3, 4:
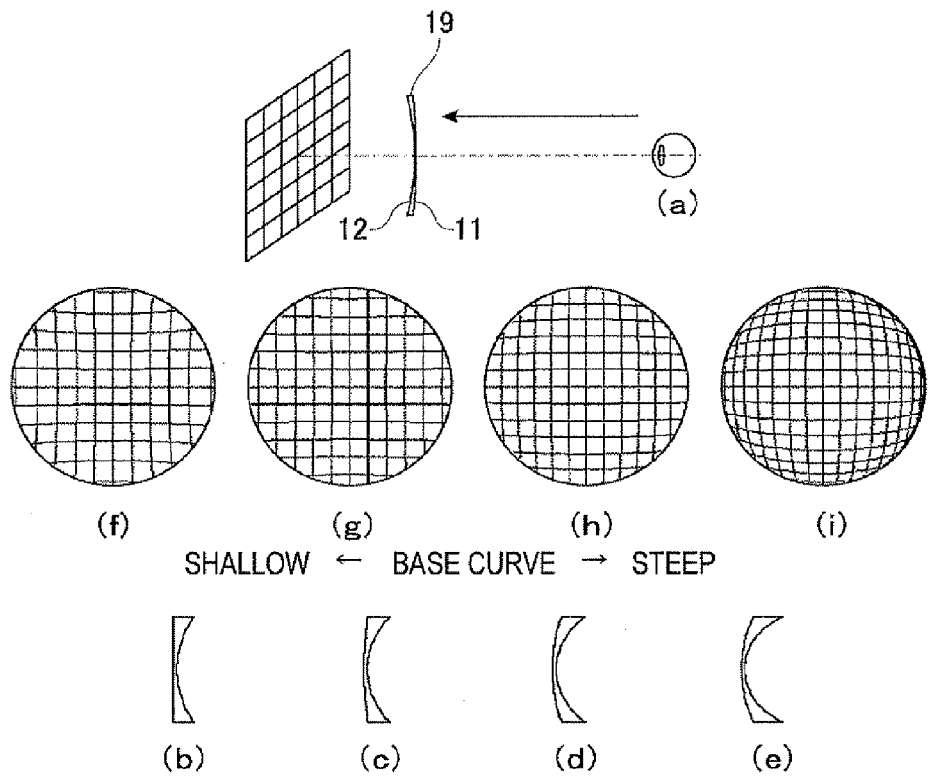
FIG. 4 shows items to be considered in designing a lens with priority placed on performance in use or an external appearance.

FIG. 4 shows a summary of results of evaluation from a person who wears eyeglasses and views an object therethrough and evaluation from a person who looks at the wearer wearing the eyeglasses. A spectacle lens designed with priority placed on performance in use produces a small amount of distortion recognized by the wearer but has a steep base curve and a large lens thickness and produces a large amount of distortion recognized by a person who looks at the wearer through the spectacle lens. On the other hand, a spectacle lens designed with priority placed on an exterior appearance has a shallow base curve and a small lens thickness and produces a small amount of distortion recognized by a person who looks at the wearer through the spectacle lens, but produces a large amount of distortion recognized by the wearer. In view of the fact described above, it is difficult in related art to design a spectacle lens having both satisfactory performance in use and exterior appearance (easy to use, highly fashionable, high performance in use, and stylish exterior appearance).

Figure 5:
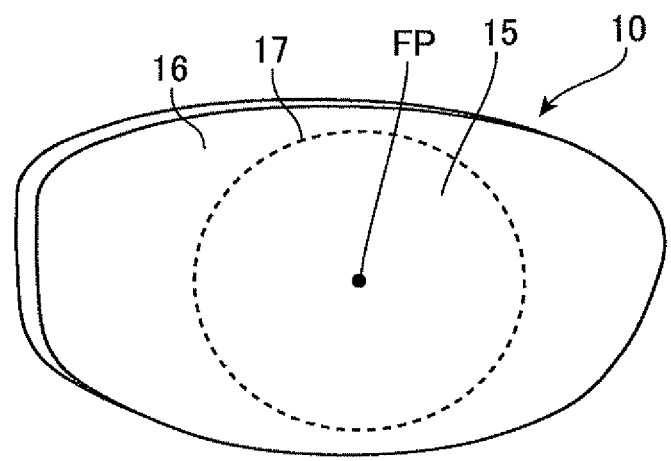
FIG. 5 is a schematic view showing a spectacle lens according to the embodiment.

FIG. 5 shows the spectacle lens 10 according to the embodiment. The spectacle lens 10 achieves both satisfactory performance in use and a stylish exterior appearance and includes a circular central comfort zone (second region) 15 around a fitting point FP and a stylish zone (first region) 16 outside the comfort zone 15. The spectacle lens 10 provides satisfactory performance in use through the central comfort zone 15 and a stylish exterior appearance through the outer stylish zone 16. In other words, the spectacle lens 10 is a high-quality spectacle lens for viewing an object and being viewed by other people. In FIG. 5, in which a boundary 17 between the comfort zone 15 and the stylish zone 16 is drawn with an imaginary curved line for ease of illustration, the boundary 17 is not actually viewed as a line or a shadow. The comfort zone 15 and the stylish zone 16 may be adjacent to each other or sandwich a zone that provides another function. This holds true for the following description.

The comfort zone 15 is so designed that it provides comfortable vision and ensures a clear, clean field of view through a central portion of the lens 10. The comfort zone 15 is therefore so designed (corrected, adjusted) that an error of average power AvP with respect to prescribed power SPH (average power error, power error) is small and that the amount of astigmatism AS is also small.

The stylish zone 16 is so designed that the thickness of a peripheral portion of the lens is reduced and a vortex-like pattern in the peripheral portion of the lens is suppressed, whereby a stylish exterior appearance is ensured. Further, the spectacle lens 10 is so designed that the stylish zone 16 allows not only the wearer to be naturally viewed therethrough but also the wearer to naturally view an object therethrough. That is, when the comfort zone 15 and the stylish zone 16 of the spectacle lens 10 are compared with each other, the stylish zone (first region) 16 is a region where a wearer's eyeball pivotal angle β ranges from 20 to 60 degrees and correcting astigmatism AS in distance vision has priority over correcting average power AvP with respect to prescribed power SPH, and the comfort zone (second region) 15 is a region which is inside the stylish zone 16 and where correcting average power AvP has priority over correcting astigmatism AS.

That is, the stylish zone 16 of the spectacle lens 10, when compared with the comfort zone 15, is allowed to have a power error to some extent, whereas correcting astigmatism AS has priority over suppressing the power error, and the astigmatism AS is so corrected that the value thereof oscillates or converges to nearly zero. As a result, in the stylish zone 16, the clarity of an image may decrease because the prescribed power SPH is not ensured, but an image is not blurred because astigmatism AS is suppressed, whereby a clearest possible image is provided while a power error is allowed to present. Since the amount of astigmatism AS is reduced in the stylish zone 16, distortion of an image and a vortex-like pattern are also suppressed. The stylish zone 16 of the spectacle lens 10 is therefore so designed not only to have a stylish exterior appearance but also to provide a sufficiently clear image through a peripheral portion of the spectacle lens 10.

For example, when the spectacle lens 19 is so designed that the power error is reduced thereacross, the aberrations become too large in a peripheral portion where the pivotal angle β is large, and a clear image is not likely provided as opposed to an initial intention, as shown in FIG. 2F. In contrast, in the spectacle lens 10, reducing astigmatism AS in a peripheral portion allows the optical performance in the peripheral portion to be improved, as typically shown in FIG. 2I. The stylish zone 16 of the spectacle lens 10 therefore not only allows the wearer to be viewed more naturally therethrough to provide a stylish exterior appearance but also corrects astigmatism AS in a peripheral portion in a satisfactory manner to allow the wearer to view an object more naturally than in related art.

Example 1 and Comparative Example 1

Figure 6A:
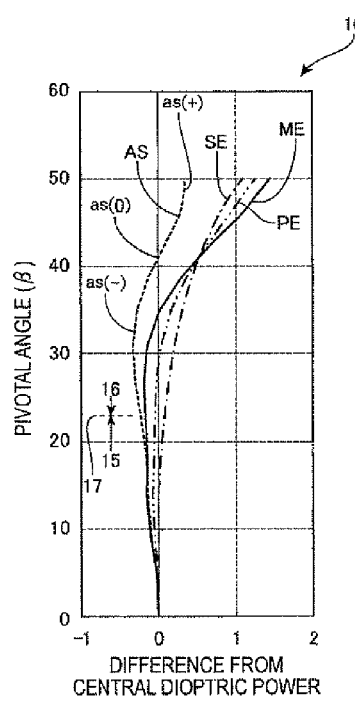
FIG. 6A shows characteristics including a power error and astigmatism of a lens according to Example 1.

FIG. 6A shows the following characteristics of a spectacle lens 10 according to Example 1: The long dashed double-dotted line represents an error PE of average power AvP with respect to prescribed power SPH (power error); and the broken line represents astigmatism AS in distance vision, which is produced when an object at infinity is viewed. The power error PE and astigmatism AS in FIG. 6A are simulation results performed under the condition that a person who wears the spectacle lens 10 views an object through both the surfaces (inner and outer surfaces) 12 and 11. The spectacle lens 10 according to Example 1 is a single-focus lens so configured that each of the object-side surface (outer surface) 11 and the eyeball-side surface (inner surface) 12 is a rotationally symmetric aspherical surface and that near-sightedness is corrected by specifying a prescribed power SPH of −10.0 D. The power error PE is a ratio (%) of the difference between the prescribed power SPH and the average power AvP to the prescribed power SPH. For example, since the power of the spectacle lens 10 according to Example 1 is −10.0 D, the power error PE is +1.0 D in difference or 10% in ratio when the average power AvP is −9.0 D. Specific lens data are as follows.

Vertex power [D]: −10.00
Outer surface paraxial curvature (0) [D]: 0.50
Outer surface paraxial curvature (10) [D]: 0.49
Outer surface paraxial curvature (20) [D]: 0.41
Outer surface paraxial curvature (30) [D]: 0.25
Inner surface paraxial curvature (0) [D]: 10.50
Inner surface paraxial curvature (10) [D]: 10.12
Inner surface paraxial curvature (20) [D]: 8.16
Inner surface paraxial curvature (30) [D]: 6.14
Central thickness [mm]: 1.10

Further, in FIG. 6A, the solid line represents an error ME of meridional dioptric power MD with respect to the prescribed power SPH, and the long dashed dotted line represents an error SE of sagittal dioptric power SD with respect to the prescribed power SPH. The meridional dioptric power MD is dioptric power in the meridional cross-sectional surface, and the sagittal dioptric power SD is dioptric power in the sagittal cross-sectional surface. The average dioptric power (average power) AvP is the average of the meridional dioptric power MD and the sagittal dioptric power SD. The astigmatism AS is the difference between the meridional dioptric power MD and the sagittal dioptric power SD. In FIG. 6A, the astigmatism AS is the difference between the error ME of the meridional dioptric power and the error SE of the sagittal dioptric power.

The spectacle lens 10 according to Example 1 is so configured that in a region where the eyeball pivotal angle β ranges from 20 to 60 degrees, specifically, in a region where the pivotal angle β is greater than about 23 degrees, the astigmatism AS changes in such a way that it experiences a negative local maximum ("as(−)", local minimum having a negative value), zero ("as(0)"), and a positive local maximum (as(+), local maximum having a positive value) as the pivotal angle β increases, as shown in FIG. 6A. Further, the astigmatism AS changes in such a way that the error ME of the meridional dioptric power and the error SE of the sagittal dioptric power approach each other, intersect each other, and then approach each other again as the pivotal angle β increases in the region described above. That is, the meridional dioptric power MD and the sagittal dioptric power SD change in such a way that they approach each other, intersect each other, and then approach each other again as the pivotal angle β increases in the region described above. In this region, the power error FE with respect to the prescribed power SPH (−10.00) is about 14% at a pivotal angle β of 50 degrees, whereas the astigmatism AS is so corrected that it oscillates and converges to zero. No evaluation on the spectacle lens for pivotal angles greater than 50 degrees has been made because total reflection occurs when the pivotal angle β is about 50 degrees at the inner surface of the spectacle lens, which has a prescribed power SPH of −10.0 D. In the following Examples and Comparative Examples, no evaluation is also made for pivotal angles greater than a value where total reflection occurs, which depends on the prescribed power SPH.

On the other hand, in a region where the pivotal angle β is smaller than about 23 degrees, the error ME of the meridional dioptric power and the error SE of the sagittal dioptric power have opposite signs (ME is negative and SE is positive in Example 1) and change in such a way that they deviate from each other as the pivotal angle β increases. That is, the meridional dioptric power MD and the sagittal dioptric power SD change in such a way that they deviate from each other as the pivotal angle β increases. In this region, the power error PE is substantially zero and the astigmatism AS is well corrected, but the astigmatism AS increases with the pivotal angle β.

As described above, the spectacle lens 10 has two regions on opposite sides of a boundary 17 where the pivotal angle β is about 23 degrees: The outer region is the first region (stylish zone) 16 where correcting the astigmatism AS in distance vision has priority over correcting the average power with respect to the prescribed power SPH (power error PE); and the inner region, that is, a central portion of the spectacle lens 10 inside the boundary 17, is the second area (comfort zone) 15 where correcting the average power (power error PE) has priority over correcting the astigmatism AS.

Figure 6B:
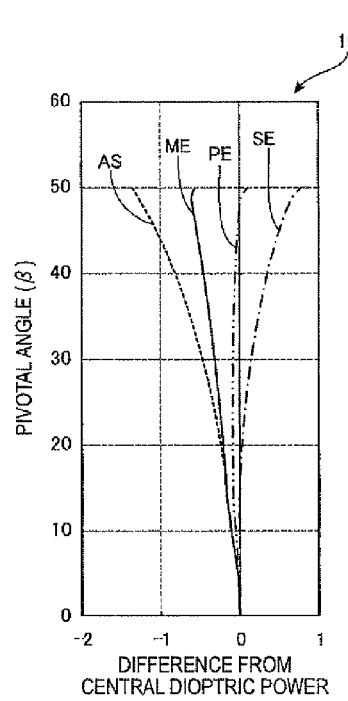
FIG. 6B shows characteristics including a power error and astigmatism of a lens according to Comparative Example 1, and FIG. 6C show distortion.

FIG. 6B shows the following characteristics of a spectacle lens 19 according to Comparative Example 1: The long dashed double-dotted line represents the error PE of the average power AvP with respect to the prescribed power SPH (power error); the broken represents the astigmatism AS in distance vision; the solid line represents the error ME of the meridional dioptric power; and the long dashed dotted line represents the error SE of the sagittal dioptric power. The spectacle lens 19 according to Comparative Example 1 is a single-focus lens so configured that each of the object-side surface (outer surface) 11 and the eyeball-side surface (inner surface) 12 is a rotationally symmetric aspherical surface and that near-sightedness is corrected by specifying a prescribed power SPH of −10.0 D. Specific lens data are as follows.

Vertex power [D]: −10.00
Outer surface paraxial curvature (0) [D]: 0.50
Outer surface paraxial curvature (10) [D]: 0.49
Outer surface paraxial curvature (20) [D]: 0.41
Outer surface paraxial curvature (30) [D]: 0.25
Inner surface paraxial curvature (0) [D]: 10.50
Inner surface paraxial curvature (10) [D]: 10.20
Inner surface paraxial curvature (20) [D]: 9.23
Inner surface paraxial curvature (30) [D]: 8.63
Central thickness [mm]: 1.10

The spectacle lens 19 according to Comparative Example 1 is so configured that in a region where the pivotal angle β ranges from 0 to 50 degrees, the error ME of the meridional dioptric power and the error SE of the sagittal dioptric power change in such away that they deviate from each other as the pivotal angle β increases. As a result, the power error PE is substantially zero and the astigmatism AS increases with the pivotal angle β across the spectacle lens 19. It can therefore be said that the entire spectacle lens 19 is a comfort zone where correcting the average power (power error PE) has priority over correcting the astigmatism AS.

Figure 6C:
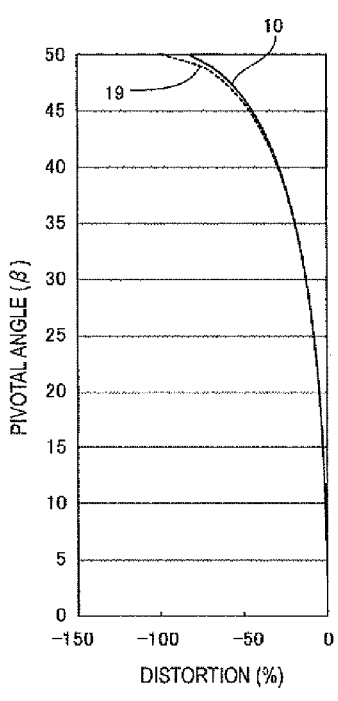

In FIG. 6C, the solid line represents distortion of the spectacle lens 10 according to Example 1 and the broken line represents distortion of the spectacle lens 19 according to Comparative Example 1. FIG. 6C shows that distortion is corrected by a greater amount in a peripheral portion of the lens, that is, in the stylish zone 16 of the spectacle lens 10 according to Example 1.

As described above, a comparison between the spectacle lens 10 according to Example 1 and the spectacle lens according to Comparative Example 1 shows that the characteristics of the central comfort zone 15 are substantially the same, and that a clear image is provided because the power error PE and the astigmatism AS are well corrected. On the other hand, in the peripheral stylish zone 16 of the spectacle lens 10 according to Example 1, a power error PE of about 15% at the maximum is allowed to be present, whereas the astigmatism AS experiences zero and oscillates in the vicinity of zero, which means that astigmatism is corrected by a greater amount than in the spectacle lens according to Comparative Example 1. As a result, in the stylish zone 16 of the spectacle lens 10 according to Example 1, astigmatism AS is corrected by a substantially greater amount at the sacrifice of a decrease in vision correction capability by ten-odd percent and distortion is also corrected by a greater amount than in the spectacle lens 19 according to Comparative Example 1.

Figure 7A:
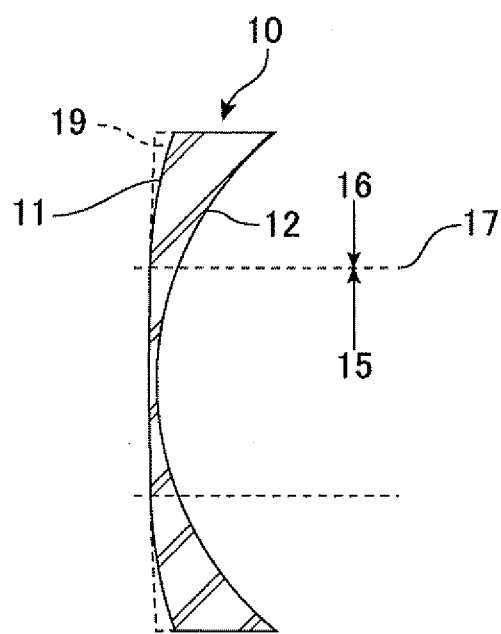
FIG. 7A shows a difference in shape of the outer surface between the lens according to Example 1 and the lens according to Comparative Example 1.
Figure 7B:
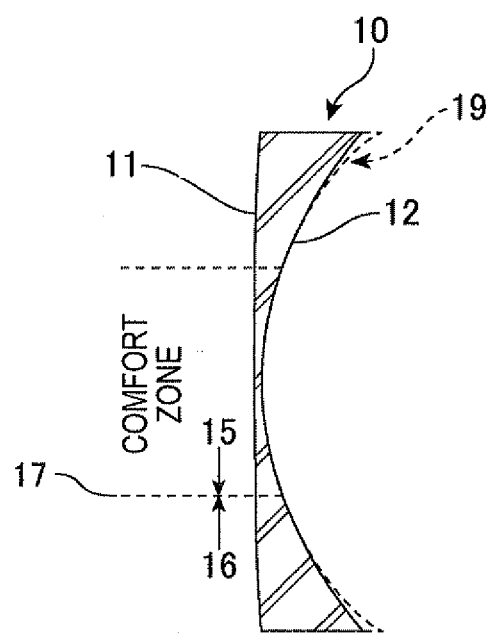
FIG. 7B shows a difference in shape of the inner surface between the lens according to Example 1 and the lens according to Comparative Example 1.

In the stylish zone 16 of the spectacle lens 10, which allows a certain amount of power error PE to be present, the base curve 11 and the inner surface curve 12 can be selected from a larger number of candidates than in the spectacle lens 19 according to Comparative Example 1, as shown in FIGS. 7A and 7B. For example, the base curve 11 of the spectacle lens 10 according to Example 1 (solid line) can be steeper (smaller radius of curvature) in a peripheral portion than the base curve 11 of the spectacle lens 19 according to Comparative Example (broken line), as shown in FIG. 7A. Further, the inner surface curve 12 of the spectacle lens 10 according to Example 1 (solid line) can be shallower (greater radius of curvature) in a peripheral portion than the inner surface curve 12 of the spectacle lens 19 according to Comparative Example 1 (broken line), as shown in FIG. 7B. In either case, the spectacle lens 10 can be thinner and lighter than the spectacle lens 19. The spectacle lens 10 according to Example 1 is suitable also in this regard for a user (wearer) who places priority on the exterior appearance.

As described above, the spectacle lens 10 according to Example 1 is superior to the spectacle lens 19 according to Comparative Example 1 in terms of performance achieved when the user views an object through the lens and performance achieved when the user is viewed through the lens. The resultant spectacle lens is therefore easy to use, has high performance in use, and is highly fashionable.

Figure 8:
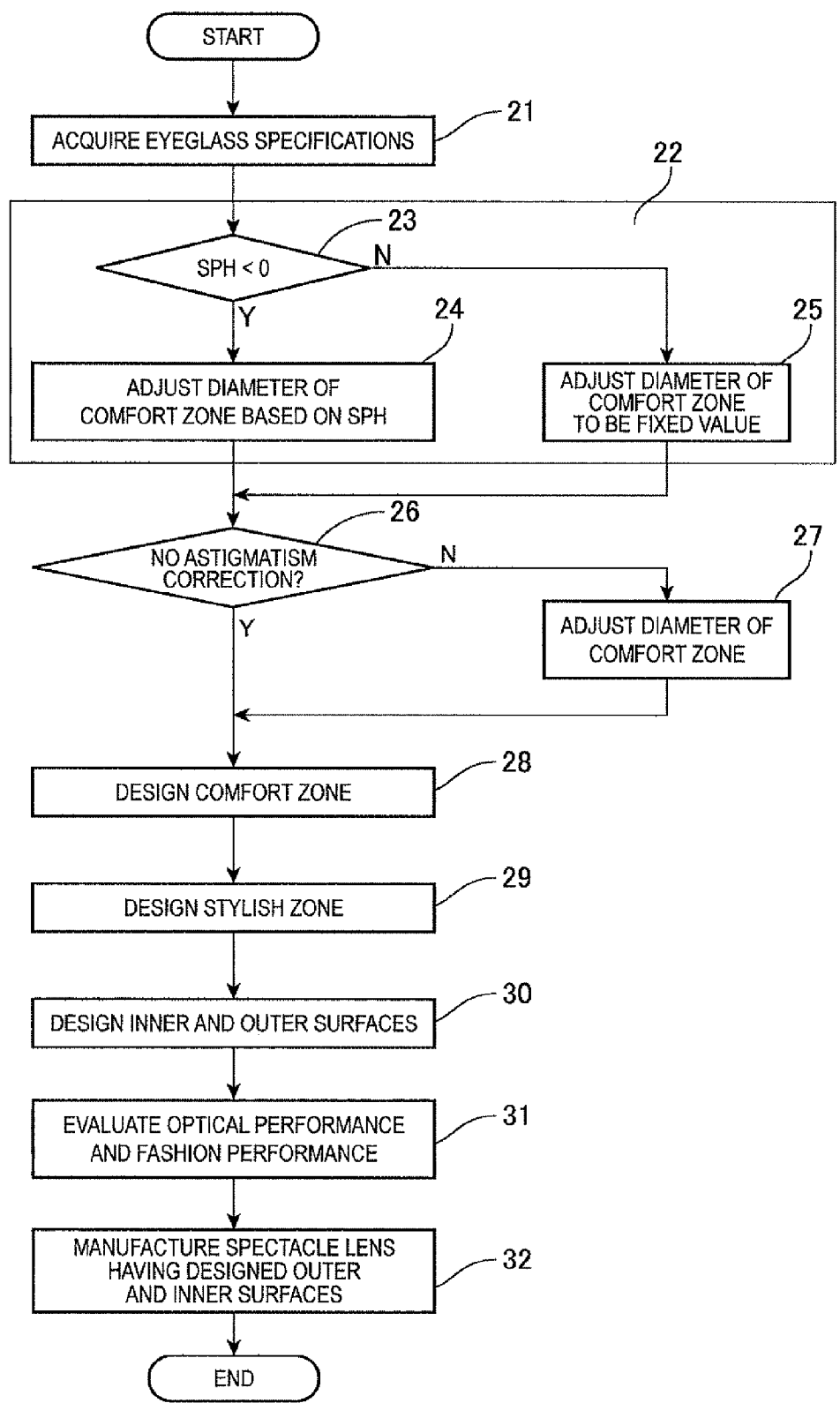
FIG. 8 is a flowchart showing schematic processes of designing and manufacturing a spectacle lens.

FIG. 8 is a flowchart showing a method for designing and manufacturing the spectacle lens 10 according to Example 1. The method described below is also applicable to Examples 2 and 9, which will be described below. In step 21, eyeglass specifications are acquired from a user (wearer). The eyeglass specifications include prescribed power SPH, whether or not astigmatism is corrected, astigmatism power (C) used when astigmatism is to be corrected, and cylinder axes (Ax) In the following step 22, a design diameter of the comfort zone (second region) 15 is set. The design diameter of the comfort zone 15 is expressed by the pivotal angle β in the following description.

In step S22, when the prescribed power SPH is negative in step 23 (YES or Y in step 23), the design diameter of the comfort zone 15 is determined in step 24 based on the prescribed power SPH, whereas when the prescribed power SPH is positive (NO or N in step 23), the design diameter of the comfort zone 15 is set in step 25 at a predetermined fixed value irrespective of the prescribed power SPH. In step 24 in Example 1, the greater the absolute value of the prescribed power SPH is (that is, the smaller the prescribed power SPH is), the smaller the design diameter of the comfort zone 15, that is, the pivotal angle β, is set. In step 25, the design diameter of the comfort zone 15, that is, the pivotal angle β, is set at 30 degrees.

Figure 9:
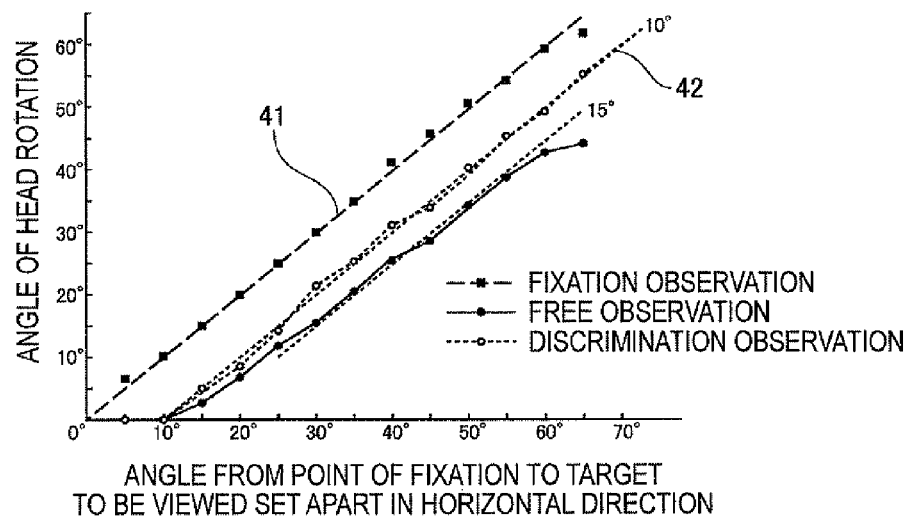
FIG. 9 shows eyeball movement versus head movement.

FIG. 9 shows examples of observed movement of the head position (eyeball position) when the wearer searches a target to be observed. The graphs shown in FIG. 9 illustrate how much the head pivots to recognize the target to be observed (object) having moved from a point of fixation in the horizontal direction by a certain angle (object presented in a position set apart from the point of fixation by a predetermined distance). In fixation observation in which the viewer follows the target being observed (object), the head pivots toward the object, as indicated by the broken line 41. On the other hand, in discrimination observation in which the viewer simply recognizes the target being observed (object), the movement of the head is smaller (less) than the angle (movement) of the object by about 10 degrees, as indicated by the dotted line 42. The result described above shows that a maximum angle of the object that the viewer can recognize only by moving the eyeballs can be set at about 10 degrees. It is therefore believed that a viewing angle α within which a person observes an object by moving the eyeballs while naturally moving the head is about 10 degrees at the maximum. Under this assumption, a region where a clear image is provided through eyeglasses, that is, the comfort zone 15 of the spectacle lens 10, is desirably at least 10 degrees in terms of viewing angle α.

On the other hand, a range within which an object can be recognized only by moving the eyeballs is called a field of fixation and about 50 degrees in terms of radius of visual angle. When a person actually views an object that is not positioned in front of the person, however, eyeball movement, head movement, and body movement occur coordinately, and the range of eyeball movement is limited to about 30 degrees in terms of radius of visual angle (viewing angle α). Further, a peripheral portion of the retina, where the resolution is low, for example, about 50 degrees in terms of radius of visual angle (viewing angle α), still receives spatial information and recognizes distortion of an image. The comfort zone 15 is therefore large enough when it covers a viewing angle α of about 30 degrees. It is, however, desirable that a moderate amount of spatial information can be inputted to the eyeball also through the stylish zone 16 positioned outside the comfort zone 15.

Figures 10A, 10B:
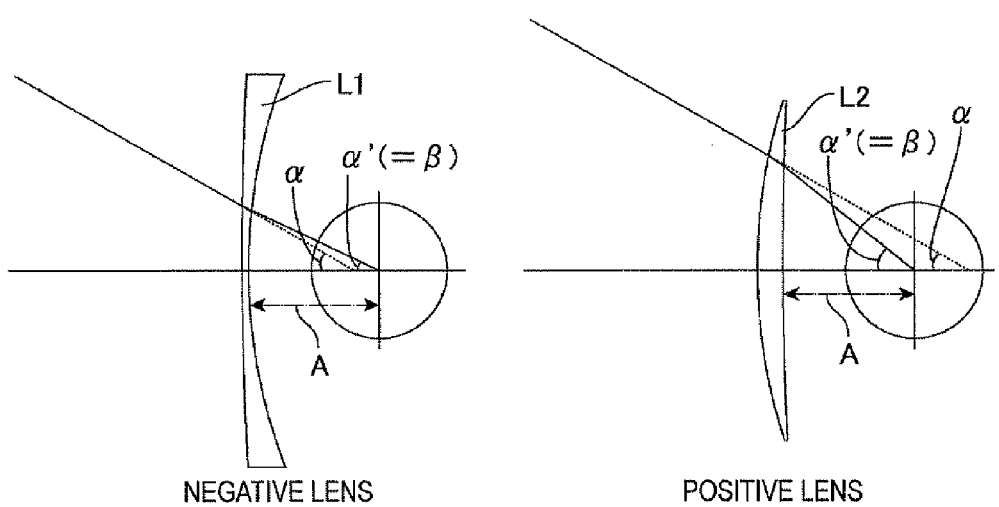
FIG. 10A describes the viewing angle achieved through a negative lens, and FIG. 10B describes the viewing angle achieved through a positive lens.

FIGS. 10A and 10B show the relationship between the viewing angle α of the naked eye and a viewing angle α' achieved through a spectacle lens. FIG. 10A shows a state in which an object is viewed through a lens L1 having negative dioptric power, and FIG. 10B shows a state in which an object is viewed through a lens L2 having positive dioptric power. The viewing angle α' achieved through the spectacle lens L1, which has negative dioptric power, is smaller than the viewing angle α of the naked eye, whereas the viewing angle α' achieved through the spectacle lens L2, which has positive dioptric power, is greater than the viewing angle α of the naked eye. To provide a field of view equivalent to the viewing angle α of the naked eye (hereinafter referred to as viewing angle α) through either of the spectacle lenses, the eyeball pivots by a certain angle (pivotal angle) β, which is equal to the viewing angle α'. The relationship between the viewing angle α' achieved through a spectacle lens and the viewing angle α of the naked eye is determined by the sum A of the eyeball pivotal distance and the eyeglass-vertex distance, the dioptric power of the spectacle lens, the thickness of the spectacle lens, and other factors.

Figure 11:
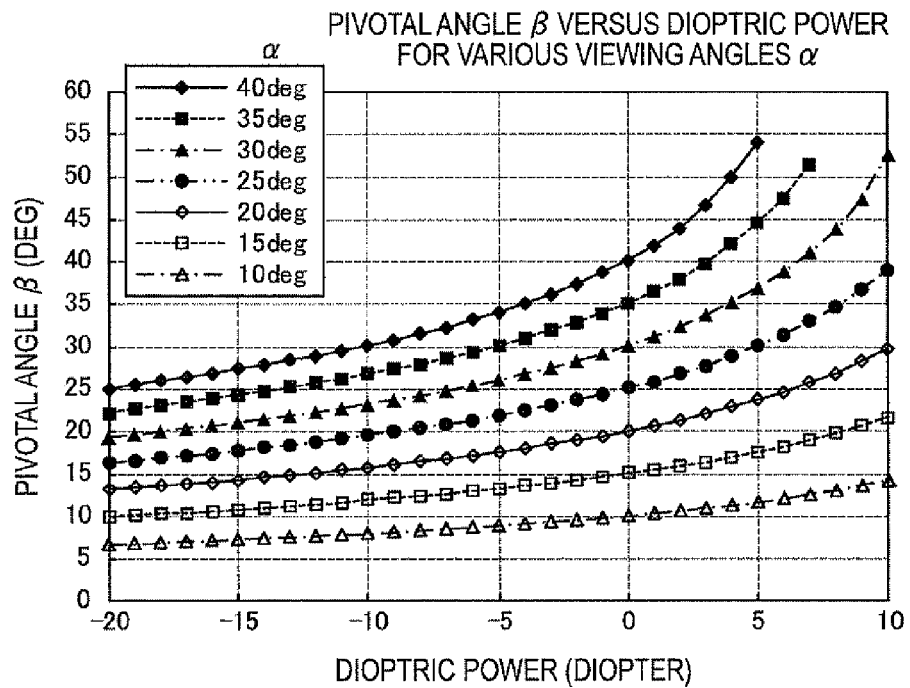
FIG. 11 shows a pivotal angle β versus dioptric power by using the viewing angle α as a parameter.

FIG. 11 shows the relationship between the dioptric power and the pivotal angle β determined under standard conditions by using the viewing angle α of a spectacle lens as a parameter. For example, to ensure a viewing angle α of 30 degrees when an object is viewed through a spectacle lens having a dioptric power of −10.0 D, the pivotal angle β is about 23 degrees. To ensure a viewing angle of 30 degrees when an object is viewed through a spectacle lens having a dioptric power of 0.0 D, the pivotal angle β is about 30 degrees. To ensure a viewing angle of 30 degrees when an object is viewed through a spectacle lens having a dioptric power of 5.0 D, the pivotal angle β is about 37 degrees. The design diameter of the comfort zone 15 so designed that a viewing angle of 30 degrees is ensured can therefore be changed by changing the prescribed power SPH. In particular, when the prescribed power SPH is negative, the area of the stylish zone 16 can be increased by reducing the size of the comfort zone 15. On the other hand, when the prescribed power SPH is positive and the dioptric power is large, the size of the comfort zone 15 corresponding to the dioptric power increases, which prevents the area of the stylish zone 16 from being large enough. The pivotal angle β is therefore preferably fixed so that the area of the stylish zone 16 is large enough.

Figure 12:
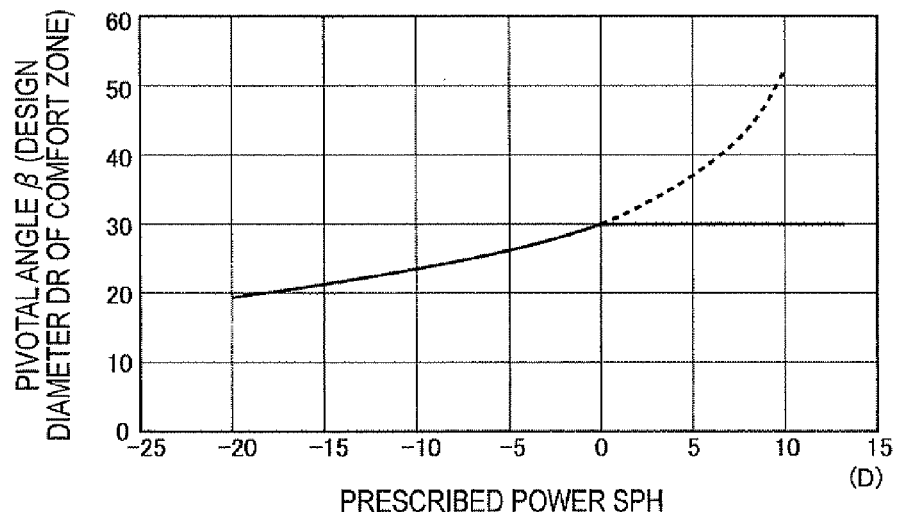
FIG. 12 shows an example of a function for setting the pivotal angle corresponding to a comfort zone based on prescribed power.

FIG. 12 shows the relationship between the design diameter (radius) DR of the comfort zone 15 and the prescribed power SPH of the spectacle lens 10 according to Example 1 by using the pivotal angle β measured from the fitting point FP instead of the design diameter DR. When the prescribed power SPH is negative, the area of the stylish zone 16 can be increased by setting the design diameter DR of the comfort zone 15 to be a value corresponding to the pivotal angle β that ensures a viewing angle α of 30 degrees and is theoretically derived from the prescribed power SPH. On the other hand, when the prescribed power SPH is positive (SPH is zero or greater), the stylish zone 16 can be ensured by fixing the design diameter DR of the comfort zone 15 at a value corresponding to a pivotal angle β of 30 degrees.

Therefore, in step 22 in which the design diameter DR of the comfort zone 15 is set, when the prescribed power SPH is negative in step 23, a smaller design diameter DR of the comfort zone (second region) 15 is set in step 24 when the absolute value of the prescribed power SPH is greater, as shown in FIG. 8. On the other hand, when the prescribed power SPH is positive, the design diameter DR of the comfort zone 15 is set in step 25 at a fixed value irrespective of the prescribed power SPH.

It is also possible to design a spectacle lens in such a way that priority is placed on ensuring a sufficiently large viewing angle α for a user who prefers performance in use to stylish performance. In this case, step 23 is skipped, and the design diameter DR of the comfort zone 15 can be adjusted in accordance with the prescribed power SPH in step 24 even when the prescribed power SPH is positive. For example, the design diameter DR of the comfort zone 15 can be set to a value corresponding to a pivotal angle β derived from the prescribed power SPH, as indicated by the broken line of the graph shown in FIG. 12.

It is then checked in step 26 whether or not the eyeglass specifications include specification on astigmatism correction. When no astigmatism correction is specified (YES or Y in step 26), the design diameter DR set in step 24 or 25 is used. Since the spectacle lens 10 according to Example 1 has a rotationally symmetric aspherical surface, the comfort zone 15 designed based on the diameter DR has a circular shape. When astigmatism correction is specified (NO or N in step 26), the design diameter DR of the comfort zone 15 is determined in step 27, as in step 22, based on a value obtained by adding astigmatism power C to the prescribed power SPH for each cylinder axis Ax. When the eyeglass specifications include a specification on astigmatism correction, the dioptric power varies for each cylinder axis Ax. When the dioptric power for a certain cylinder axis Ax is negative, the design diameter DR of the comfort zone 15 for that cylinder axis Ax differs from the design diameters DR for other cylinder axes Ax. Since the spectacle lens 10 according to Example 1 is rotationally symmetric, the comfort zone 15 has an elliptical design shape.

The design diameter DR and the design shape of the comfort zone 15 are an imaginary diameter and shape determined before each of the outer surface 11 and the inner surface 12 of the spectacle lens 10 is designed by using a smooth aspherical surface. The spectacle lens 10, which is manufactured based on the aspherical surfaces having been determined to manufacture the outer surface 11 and the inner surface 12 as will be described below, therefore keeps optical characteristics that reflect the design diameter DR and the design shape, but the design diameter DR and the design shape are not always fully optically detected.

After the design diameter DR of the comfort zone 15 is thus determined, aspherical outer and inner surfaces 11, 12 that form the comfort zone 15 are designed in step 28. In the comfort zone 15, in which correcting the average power has priority over correcting astigmatism AS, the outer surface 11 and the inner surface 12 are so determined that the power error PE is very small or substantially zero and the prescribed power SPH specified in the eyeglass specifications is achieved. In an example of the thus designed outer surface 11 and inner surface 12, the meridional dioptric power MD (meridional dioptric power error ME) and the sagittal dioptric power SD (sagittal dioptric power error SE) change in such a way that they deviate from each other as the pivotal angle β increases.

Before or after or concurrently with the design of the comfort zone 15, aspherical outer and inner surfaces 11, 12 that form the stylish zone 16 are designed in step 29. Since the stylish zone 16 is provided outside the comfort zone 15 and the design diameter DR of the comfort zone 15 changes with the prescribed power SPH, the range of the stylish zone 16 also changes with the prescribed power SPH. The stylish zone 16, however, corresponds to pivotal angles β ranging from 20 to 60 degrees irrespective of the prescribed power in most cases. The outer surface 11 and the inner surface 12 of the stylish zone 16 are so determined that correcting astigmatism AS in distance vision has priority over correcting the average power with respect to the prescribed power SPH and that the astigmatism AS approaches zero at the sacrifice of a certain amount of power error PE.

As an example of the outer surface 11 and the inner surface 12 of the stylish zone 16, the astigmatism AS changes in such a way that it experiences a negative local maximum on one side of zero and a positive local maximum on the other side. When the prescribed power SPH is negative, the outer surface 11 and the inner surface 12 are so designed that the astigmatism AS oscillates to experience a negative local maximum, zero, and a positive local maximum and converges to zero as closely as possible. For example, the outer surface 11 and the inner surface 12 can be so designed that the meridional dioptric power MD (meridional dioptric power error ME) and the sagittal dioptric power SD (sagittal dioptric power error SE) approach each other, intersect each other, and then approach each other again as the pivotal angle β increases. When the prescribed power SPH is negative, the outer surface 11 and the inner surface 12 can be so designed that the meridional dioptric power error ME changes from negative to positive and intersects the sagittal dioptric power error SE on the positive side.

In the process of designing the outer surface 11 and the inner surface 12 of the stylish zone 16, a maximum error MPE, which is the greatest acceptable power error PE, is desirably smaller than or equal to 30% of the prescribed power SPH. The maximum error MPE is more preferably smaller than or equal to 25% of the prescribed power SPH, still more preferably 20% thereof. When MPE is greater than 30% in the stylish zone 16, optical performance of the stylish zone 16 is significantly degraded to a point where it does not function as a spectacle lens.

Aspherical outer and inner surfaces 11, 12 of the spectacle lens 10 including the comfort zone 15 and the stylish zone 16 are then designed in step 30. Specifically, aspherical outer and inner surfaces 11, 12 are so determined that the zones 15 and 16 determined in steps 28 and 29 described above are smoothly connected to each other.

Thereafter, optical performance achieved when a user views an object through the spectacle lens 10 having the resultant outer surface 11 and inner surface 12, fashion performance achieved when the user of the spectacle lens 10 is viewed therethrough, and other factors are evaluated in step 31. After the spectacle lens 10 that satisfies a user's desire is designed, the spectacle lens 10 having the thus designed outer surface 11 and inner surface 12 is manufactured in step 32.

Example 2 and Comparative Example 2

Figure 13A:
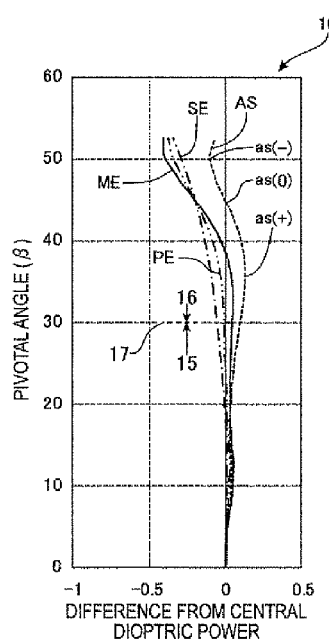
FIG. 13A shows characteristics including a power error and astigmatism of a lens according to Example 2.

FIG. 13A shows the following characteristics of a spectacle lens 10 according to Example 2: The long dashed double-dotted line represents an error PE of average power AvP with respect to prescribed power SPH (power error); the broken line represents astigmatism AS in distance vision; the solid line represents an error ME of meridional dioptric power; and the long dashed dotted line represents an error SE of sagittal dioptric power. The spectacle lens 10 according to Example 2 is also a single-focus lens so configured that each of the outer surface 11 and the inner surface 12 is a rotationally symmetric aspherical surface and that far-sightedness is corrected by specifying a prescribed power SPH of +2.0 D. Specific lens data are as follows.

Vertex power [D]: 2.00
Outer surface paraxial curvature (0) [D]: 3.97
Outer surface paraxial curvature (10) [D]: 3.79
Outer surface paraxial curvature (20) [D]: 3.23
Outer surface paraxial curvature (30) [D]: 2.42
Inner surface paraxial curvature (0) [D]: 2.00
Inner surface paraxial curvature (10) [D]: 1.99
Inner surface paraxial curvature (20) [D]: 1.80
Inner surface paraxial curvature (30) [D]: 1.49
Central thickness [mm]: 2.70

The spectacle lens 10 according to Example 2 is also so configured that in a region where the eyeball pivotal angle β ranges from 20 to 60 degrees, specifically, in a region where the pivotal angle β is greater than about 30 degrees, the astigmatism AS changes in such a way that it experiences a positive local maximum (as (+)), zero (as (0)), and a negative local maximum (as (−)). Further, the astigmatism AS changes in such a way that the error ME of the meridional dioptric power and the error SE of the sagittal dioptric power approach each other, intersect each other, and then approach each other again as the pivotal angle β increases in the region described above. In Example 2, the meridional dioptric power error ME shifted toward the positive side shifts toward the negative side and intersects the sagittal dioptric power error SE. In this region, the power error PE is therefore about 20% of the prescribed power SPH (2.0 D) at a pivotal angle β of 50 degrees, but instead, the astigmatism AS is so corrected that it oscillates and converges to zero.

On the other hand, in a region where the pivotal angle β is smaller than 30 degrees, the error ME of the meridional dioptric power and the error SE of the sagittal dioptric power change in such a way that they deviate from each other as the pivotal angle β increases. In this region, the power error PE is substantially zero and the astigmatism AS is well corrected, but the astigmatism AS increases with the pivotal angle β.

The spectacle lens 10 thus has two regions on opposite sides of a boundary 17 where the pivotal angle β is 30 degrees: The outer region (where pivotal angle β is larger) is the first region (stylish zone) 16 where correcting the astigmatism AS in distance vision has priority over correcting the average power with respect to the prescribed power SPH (power error PE) and an inner region, that is, a central portion of the spectacle lens 10 inside the boundary 17, is the second region (comfort zone) 15 where correcting the average power (power error PE) has priority over correcting the astigmatism AS.

Figure 13B:
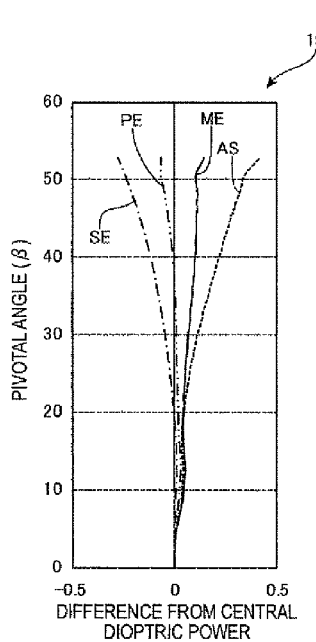
FIG. 13B shows characteristics including a power error and astigmatism of a lens according to Comparative Example 2, and FIG. 13C show distortion.

FIG. 13B shows the following characteristics of a spectacle lens 19 according to Comparative Example 2: The long dashed double-dotted line represents the error PE of the average power AvP with respect to the prescribed power SPH (power error); the broken represents the astigmatism AS in distance vision; the solid line represents the error ME of the meridional dioptric power; and the long dashed dotted line represents the error SE of the sagittal dioptric power. The spectacle lens 19 according to Comparative Example 2 is also a single-focus lens so configured that each of the outer surface 11 and the inner surface 12 is a rotationally symmetric aspherical surface and that far-sightedness is corrected by specifying a prescribed power SPH of +2.0 D. Specific lens data are as follows.

Vertex power [D]: 2.00
Outer surface paraxial curvature (0) [D]: 3.97
Outer surface paraxial curvature (10) [D]: 3.79
Outer surface paraxial curvature (20) [D]: 3.23
Outer surface paraxial curvature (30) [D]: 2.42
Inner surface paraxial curvature (0) [D]: 2.00
Inner surface paraxial curvature (10) [D]: 1.97
Inner surface paraxial curvature (20) [D]: 1.73
Inner surface paraxial curvature (30) [D]: 1.28
Central thickness [mm]: 2.70

The spectacle lens 19 according to Comparative Example 2 is so configured that in a region where the pivotal angle β ranges from 0 to 50 degrees, the error ME of the meridional dioptric power and the error SE of the sagittal dioptric power change in such a way that they deviate from each other as the pivotal angle β increases. As a result, the power error PE is substantially zero and the astigmatism AS increases with the pivotal angle β across the spectacle lens 19. It can therefore be said that the entire spectacle lens 19 is a comfort zone where correcting the average power (power error PE) has priority over correcting the astigmatism AS.

Figure 13C:
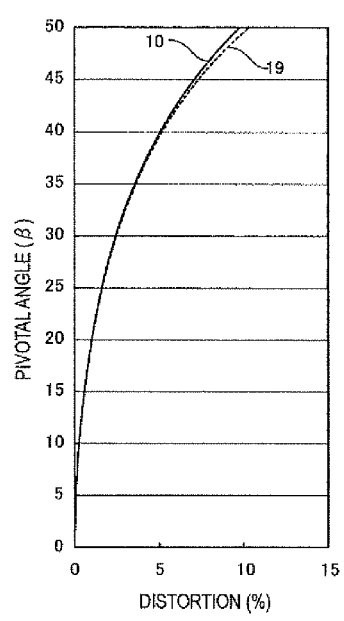

In FIG. 13C, the solid line represents distortion of the spectacle lens 10 according to Example 2 and the broken line represents distortion of the spectacle lens 19 according to Comparative Example 2. FIG. 13C shows that distortion is corrected by a greater amount in a peripheral portion of the lens, that is, in the stylish zone 16 of the spectacle lens 10 according to Example 2.

As described above, a spectacle lens having positive prescribed power SPH can also have a central comfort zone 15 where the power error PE and the astigmatism AS are well corrected and hence a clear image is provided and a peripheral stylish zone 16 where the astigmatism AS experiences zero and oscillates in the vicinity of zero (becomes almost zero) at the sacrifice of a certain amount of power error PE, as in a spectacle lens having negative prescribed power SPH. Further, in a spectacle lens having positive prescribed power SPH, providing the stylish zone 16 improves both the performance of the peripheral portion of the spectacle lens 10 achieved when the wearer views an object therethrough and the performance of the peripheral portion achieved when the wearer is viewed therethrough.

Figure 14A:
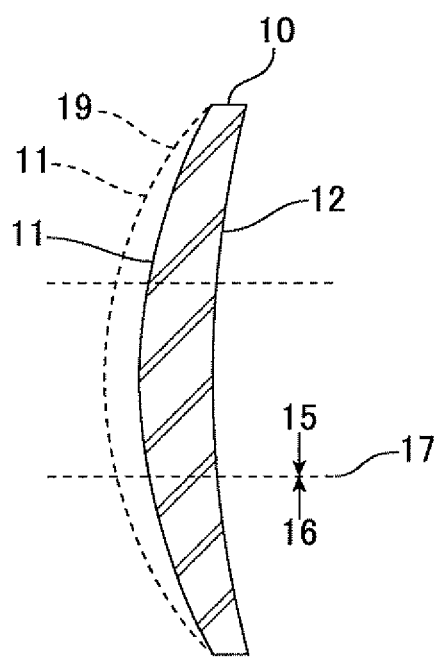
FIG. 14A shows a difference in shape of the outer surface between the lens according to Example 2 and the lens according to Comparative Example 2.
Figure 14B:
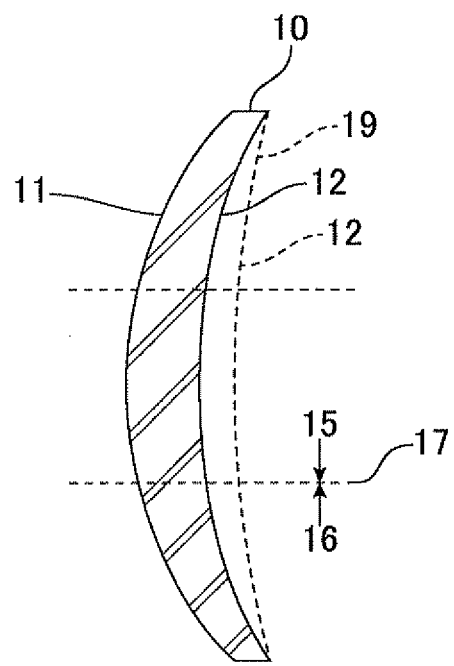
FIG. 14B shows a difference in shape of the inner surface between the lens according to Example 2 and the lens according to Comparative Example 2.

In the stylish zone 16 of the spectacle lens 10, which allows a certain amount of power error PE to be present, the base curve 11 and the inner surface curve 12 can be selected from a larger number of candidates than in the spectacle lens 19 according to Comparative Example 2, as shown in FIGS. 14A and 14B. For example, the base curve 11 of the spectacle lens 10 according to Example 2 (solid line) can be shallower (greater radius of curvature) in a peripheral portion than the base curve 11 of the spectacle lens 19 according to Comparative Example 2 (broken line), as shown in FIG. 14A. Further, the inner surface curve 12 of the spectacle lens 10 according to Example 2 (solid line) can be steeper (smaller radius of curvature) in a peripheral portion than the inner surface curve 12 of the spectacle lens 19 according to Comparative Example 2 (broken line), as shown in FIG. 14B. In either case, the spectacle lens 10 can be thinner and lighter than the spectacle lens 19. The spectacle lens 10 according to Example 2 is suitable also in this regard for a user who places priority on the exterior appearance.

The spectacle lens 10 having positive prescribed power SPH according to Example 2 is so configured that the design diameter DR of the comfort zone 15 is set at 30 degrees as described in step 22 in FIG. 8. Alternatively, the size of the comfort zone 15 can be increased to satisfy a viewing angle α of 30 degrees. In this case, the size of the stylish zone 16 decreases, but the range over which the function of the comfort zone 16 is provided increases.

Example 3 and Comparative Example 3

Figure 15A:
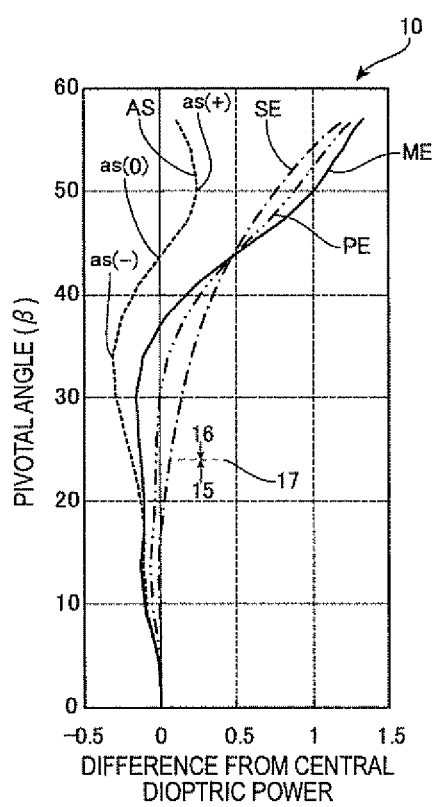
FIG. 15A shows characteristics in a 90-degree direction including a power error and astigmatism of a lens according to Example 3.
Figure 15B:
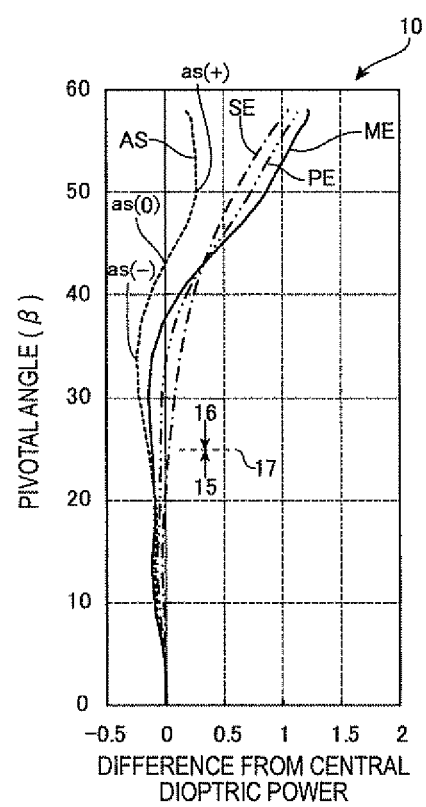

FIGS. 15A and 15B show the following characteristics of a spectacle lens 10 according to Example 3: Each long dashed double-dotted line represents an error PE of average power AvP with respect to prescribed power SPH (power error); each broken line represents astigmatism AS in distance vision; each solid line represents an error ME of meridional dioptric power; and each long dashed dotted line represents an error SE of sagittal dioptric power. The spectacle lens 10 according to Example 3 is a spectacle lens including astigmatism correction and having a prescribed power SPH of −5.0 D, an astigmatism power C of −1.0 D, and a cylinder axis Ax of 180 degrees. FIG. 15A shows change in each of the values described above along the 90-degree axis, and FIG. 15B shows change in each of the values described above along the 180-degree axis, which is the cylinder axis Ax. Specific lens data are as follows.

Spherical surface power [D]: −5.00
Astigmatism power [D]: −1.00
Cylinder axis: 180 degrees
Outer surface paraxial curvature (0) [D]: 1.00
Outer surface paraxial curvature (10) [D]: 0.98
Outer surface paraxial curvature (20) [D]: 0.82
Outer surface paraxial curvature (30) [D]: 0.50
180-degree inner surface paraxial curvature (0) [D]: 6.00
180-degree inner surface paraxial curvature (10) [D]: 5.62
180-degree inner surface paraxial curvature (20) [D]: 4.32
180-degree inner surface paraxial curvature (30) [D]: 2.52

90-degree inner surface paraxial curvature (0) [D]: 7.00
90-degree inner surface paraxial curvature (10) [D]: 6.60
90-degree inner surface paraxial curvature (20) [D]: 5.15
90-degree inner surface paraxial curvature (30) [D]: 3.12
Central thickness [mm]: 1.10

The spectacle lens 10, in which adding astigmatism correction makes lens curves complex as shown in FIGS. 15A and 15B, is so designed in the 90-degree direction that the stylish zone 16 is outside a boundary 17 where the pivotal angle β is about 24 degrees and the comfort zone 15 is inside the boundary 17. The spectacle lens 10 is further so designed in the 180-degree direction that the stylish zone 16 is outside a boundary 17 where the pivotal angle β is about 26 degrees and the comfort zone 15 is inside the boundary 17.

As a result, in the spectacle lens 10, the design shape of the comfort zone 15, which is indicated by the broken line in FIG. 16, is an ellipse having a short design diameter DR along a 90-degree direction 10a passing through the fitting point FP and a long design diameter DR along a 180-degree direction 10b passing through the fitting point FP. The design shape of the comfort zone 15 is therefore not circular around the fitting point FP, unlike in the spectacle lenses 10 described above in which no astigmatism correction is considered. It is, however, noted that the configuration of the comfort zone 15 and the stylish zone 16 is the same as that of the spectacle lens 10 according to Example 1.

FIGS. 17A and 17B show characteristic of a spectacle lens 19 according to Comparative Example 3: The long dashed double-dotted line represents an error PE of average power AvP with respect to prescribed power SPH (power error); the broken line represents astigmatism AS in distance vision; the solid line represents an error ME of meridional dioptric power; and the long dashed dotted line represents an error SE of sagittal dioptric power. The spectacle lens 19 according to Comparative Example 3 is a spectacle lens including astigmatism correction and having a prescribed power SPH of −5.0 D, an astigmatism power C of −1.0 D, and a cylinder axis Ax of 180 degrees. FIG. 17A shows change in each of the values described above along the 90-degree axis, and FIG. 17B shows change in each of the values described above along the 180-degree axis, which is the cylinder axis Ax. Specific lens data are as follows.

Spherical surface power [D]: −5.00
Astigmatism power [D]: −1.00
Cylinder axis: 180 degrees
Outer surface paraxial curvature (0) [D]: 1.00
Outer surface paraxial curvature (10) [D]: 0.98
Outer surface paraxial curvature (20) [D]: 0.82
Outer surface paraxial curvature (30) [D]: 0.50
180-degree inner surface paraxial curvature (0) [D]: 6.00
180-degree inner surface paraxial curvature (10) [D]: 5.67
180-degree inner surface paraxial curvature (20) [D]: 4.69
180-degree inner surface paraxial curvature (30) [D]: 3.45
90-degree inner surface paraxial curvature (0) [D]: 7.00
90-degree inner surface paraxial curvature (10) [D]: 6.67
90-degree inner surface paraxial curvature (20) [D]: 5.64
90-degree inner surface paraxial curvature (30) [D]: 4.35
Central thickness [mm]: 1.10

In FIGS. 18A and 18B, the solid line represents distortion of the spectacle lens 10 according to Example 3 and the broken line represents distortion of the spectacle lens 19 according to Comparative Example 3. FIG. 18A shows change in distortion along the 90-degree axis, and FIG. 18B shows change in distortion along the 180-degree axis. FIGS. 18A and 18B show that distortion is corrected by a greater amount in both the axial directions in a peripheral portion of the lens, that is, in the stylish zone 16 of the spectacle lens 10 according to Example 3.

As described above, a spectacle lens including astigmatism correction specified in eyeglass specifications can also have a central comfort zone 15 where the power error PE and the astigmatism AS are well corrected and hence a clear image is provided and a peripheral stylish zone 16 where the astigmatism AS experiences zero and oscillates in the vicinity of zero at the sacrifice of a certain amount of power error PE. Further, in a spectacle lens for astigmatism correction, providing the stylish zone 16 improves both the performance of the peripheral portion of the spectacle lens 10 achieved when the wearer views an object therethrough and the performance of the peripheral portion achieved when the wearer is viewed therethrough.

Examples 4 to 9 and Comparative Examples 4 to 9

FIGS. 19A and 19B show the following characteristics of a spectacle lens 10 according to Example 4 and a spectacle lens 19 according to Comparative Example 4, respectively: Each long dashed double-dotted line represents an error PE of average power AvP with respect to prescribed power SPH (power error); each broken line represents astigmatism AS in distance vision; each solid line represents an error ME of meridional dioptric power; and each long dashed dotted line represents an error SE of sagittal dioptric power. Each of the lenses 10 and 19 is a spectacle lens for correcting near-sightedness by specifying a prescribed power SPH of −8.0 D. In FIG. 19C, the solid line represents distortion of the spectacle lens 10 according to Example 4 and the broken line represents distortion of the spectacle lens 19 according to Comparative Example 4.

The spectacle lens 10 according to Example 4 is so configured that the stylish zone 16 is outside a boundary 17 where the pivotal angle β is about 24 degrees and the comfort zone 15 is inside the boundary 17.

FIGS. 20A and 20B show the following characteristics of a spectacle lens 10 according to Example 5 and a spectacle lens 19 according to Comparative Example 5, respectively: Each long dashed double-dotted line represents an error PE of average power AvP with respect to prescribed power SPH (power error); each broken line represents astigmatism AS in distance vision; each solid line represents an error ME of meridional dioptric power; and each long dashed dotted line represents an error SE of sagittal dioptric power. Each of the lenses 10 and 19 is a spectacle lens for correcting near-sightedness by specifying a prescribed power SPH of −6.0 D. In FIG. 20C, the solid line represents distortion of the spectacle lens 10 according to Example 5 and the broken line represents distortion of the spectacle lens 19 according to Comparative Example 5.

The spectacle lens 10 according to Example 5 is so configured that the stylish zone 16 is outside a boundary 17 where the pivotal angle β is about 25 degrees and the comfort zone 15 is inside the boundary 17.

FIGS. 21A and 21B show the following characteristics of a spectacle lens 10 according to Example 6 and a spectacle lens 19 according to Comparative Example 6, respectively: Each long dashed double-dotted line represents an error PE of average power AvP with respect to prescribed power SPH (power error); each broken line represents astigmatism AS in distance vision; each solid line represents an error ME of meridional dioptric power; and each long dashed dotted line represents an error SE of sagittal dioptric power. Each of the lenses 10 and 19 is a spectacle lens for correcting near-sightedness by specifying a prescribed power SPH of −4.0 D. In FIG. 21C, the solid line represents distortion of the spectacle lens 10 according to Example 6 and the broken line represents distortion of the spectacle lens 19 according to Comparative Example 6.

The spectacle lens 10 according to Example 6 is so configured that the stylish zone 16 is outside a boundary 17 where the pivotal angle β is about 26 degrees and the comfort zone 15 is inside the boundary 17.

FIGS. 22A and 22B show the following characteristics of a spectacle lens 10 according to Example 7 and a spectacle lens 19 according to Comparative Example 7, respectively: Each long dashed double-dotted line represents an error PE of average power AvP with respect to prescribed power SPH (power error); each broken line represents astigmatism AS in distance vision; each solid line represents an error ME of meridional dioptric power; and each long dashed dotted line represents an error SE of sagittal dioptric power. Each of the lenses 10 and 19 is a spectacle lens for correcting near-sightedness by specifying a prescribed power SPH of −2.0 D. In FIG. 22C, the solid line represents distortion of the spectacle lens 10 according to Example 7 and the broken line represents distortion of the spectacle lens 19 according to Comparative Example 7.

The spectacle lens 10 according to Example 7 is so configured that the stylish zone 16 is outside a boundary 17 where the pivotal angle β is about 28 degrees and the comfort zone 15 is inside the boundary 17.

FIGS. 23A and 23B show the following characteristics of a spectacle lens 10 according to Example 8 and a spectacle lens 19 according to Comparative Example 8, respectively: Each long dashed double-dotted line represents an error PE of average power AvP with respect to prescribed power SPH (power error); each broken line represents astigmatism AS in distance vision; each solid line represents an error ME of meridional dioptric power; and each long dashed dotted line represents an error SE of sagittal dioptric power. Each of the lenses 10 and 19 is a spectacle lens for correcting far-sightedness by specifying a prescribed power SPH of +4.0 D. In FIG. 23C, the solid line represents distortion of the spectacle lens 10 according to Example 8 and the broken line represents distortion of the spectacle lens 19 according to Comparative Example 8.

The spectacle lens 10 according to Example 8 is so configured that the stylish zone 16 is outside a boundary 17 where the pivotal angle β is about 30 degrees and the comfort zone 15 is inside the boundary 17.

FIGS. 24A and 24B show the following characteristics of a spectacle lens 10 according to Example 9 and a spectacle lens 19 according to Comparative Example 9, respectively: Each long dashed double-dotted line represents an error PE of average power AvP with respect to prescribed power SPH (power error); each broken line represents astigmatism AS in distance vision; each solid line represents an error ME of meridional dioptric power; and each long dashed dotted line represents an error SE of sagittal dioptric power. Each of the lenses 10 and 19 is a spectacle lens for correcting far-sightedness by specifying a prescribed power SPH of +6.0 D. In FIG. 24C, the solid line represents distortion of the spectacle lens 10 according to Example 9 and the broken line represents distortion of the spectacle lens 19 according to Comparative Example 9.

The spectacle lens 10 according to Example 9 is so configured that the stylish zone 16 is outside a boundary 17 where the pivotal angle β is about 30 degrees and the comfort zone 15 is inside the boundary 17.

As shown in Examples described above, the invention allows a spectacle lens 10 having a comfort zone 15 and a stylish zone 16 to be designed, manufactured, and provided based on a wide range of negative to positive prescribed power SPH.

In particular, in Examples described above, a spectacle lens 10 having negative prescribed power SPH is so designed that the size of the comfort zone 15 is reduced in accordance with the prescribed power SPH specified in eyeglass specifications. According to the design described above, in a spectacle lens 10 having negative prescribed power SPH whose absolute value is large, the size of the comfort zone 15 can be reduced and the size of the stylish zone 16 can be increased accordingly. The comfort zone 15 can therefore be set at a size appropriate for a wearer based on information on prescribed power for the wearer. That is, designing the comfort zone 15 does not require any special information from the wearer, but a spectacle lens 10 according to any of Examples described above can be readily designed by using a design apparatus or any other suitable apparatus based on typical eyeglass specification information.

A spectacle lens 10 of related art having negative prescribed power SPH whose absolute value is large tends to have a large peripheral thickness, which disadvantageously causes the spectacle lens to be heavy and unfashionable. Even a spectacle lens 10 having negative prescribed power SPH whose absolute value is large can be a thin, lightweight, fashionable spectacle lens by providing a wide stylish zone 16. In particular, in designing a spectacle lens 10 having a prescribed power SPH smaller than or equal to −6.0 D or even smaller than or equal to −7.0 D, it is effective to reduce the size of the comfort zone 15 in accordance with the prescribed power SPH.

FIG. 25 shows an example of a spectacle lens design apparatus 70. The design apparatus 70 includes a unit 75 for acquiring eyeglass specifications, a first unit 71 for designing a stylish zone 16, a second unit 72 for designing a comfort zone 15, a third unit 73 for designing the inner surface 12 and the outer surface 11 of a spectacle lens 10 having the stylish zone 16 and the comfort zone 15, and an evaluation unit 74 for evaluating the designed spectacle lens 10 when a user views an object therethrough and when the user is viewed therethrough.

The second unit 72 for designing the comfort zone 15 further includes a first adjustment unit 76 that sets a smaller design diameter DR of the comfort zone 15 when the prescribed power SPH is negative and the absolute value thereof is greater and a second adjustment unit 77 that sets the design diameter DR of the comfort zone 15 at a fixed value irrespective of the prescribed power SPH when the prescribed power SPH is positive. The second unit 72 further includes a third adjustment unit 78 that adjusts the design diameter DR of the comfort zone 15 when data on astigmatism correction is specified in the eyeglass specifications. The design apparatus 70 can be implemented in an information processing apparatus, such as a personal computer including a CPU and a memory. Alternatively, a program (program product) for achieving the function of the design apparatus 70 on a computer can be stored on a CD-ROM or any other suitable memory or provided over a computer network, such as the Internet.

The design apparatus 70 acquires eyeglass specifications from a user and designs a spectacle lens 10 having a comfort zone 15 and a stylish zone 16. At the same time, the evaluation unit 74 can check the thus designed spectacle lens 10 when the user views an object therethrough and when the user is viewed therethrough. The user can therefore evaluate the designed spectacle lens 10 not only when the user uses it and when the user is viewed therethrough, whereby a fashionable spectacle lens 10 that fits with user's preference and provides excellent performance in use can be provided.

In the above description, the invention has been described with reference to a single-focus lens, and the invention may also be applicable to a progressive-power lens with a comfort zone 15 having a distance portion for distance vision and a near portion for near vision. Further, both the inner and outer surfaces may be aspherical surfaces or either of them may be an aspherical surface. The above description has been made with reference to the case where the viewing angle α provided by the comfort zone 15 (viewing angle for negative prescribed power, in particular) is 30 degrees. The viewing angle α may alternatively be smaller than or equal to 30 degrees or greater than or equal to 30 degrees.

What is claimed is:

1. A spectacle lens comprising:
   a first region which is located in at least a part of a portion of the lens where an angle of torsion of an eyeball of a wearer ranges from 20 to 60 degrees and in which correcting astigmatism has priority over correcting average power based on a prescribed power; and
   a second region which is formed inside the first region and in which correcting the average power has priority over correcting the astigmatism.

2. The spectacle lens according to claim 1, wherein the first region includes a point where a value of the astigmatism is a local minimum having a negative value and a point where the value of the astigmatism is a local maximum having a positive value.

3. The spectacle lens according to claim 1, wherein the first region includes a region where a value of meridional dioptric power and a value of sagittal dioptric power change in such a way that the value of the meridional dioptric power and the value of the sagittal dioptric power approach each other, intersect each other, and then approach each other again as the angle of torsion of the eyeball increases.

4. The spectacle lens according to claim 1, wherein a maximum error of the average power of the lens with respect to the prescribed power in the first region is 30% or smaller.

5. The spectacle lens according to claim 1, wherein the second region includes a region where a value of meridional dioptric power and a value of sagittal dioptric power change in such a way that the value of the meridional dioptric power and the value of the sagittal dioptric power deviate from each other as the angle of torsion of the eyeball increases.

6. A spectacle lens design method comprising:
   providing a first region which is located in at least a part of a portion of the lens where an angle of torsion of an eyeball of a wearer ranges from 20 to 60 degrees and in which correcting astigmatism has priority over correcting average power based on a prescribed power; and
   providing a second region which is formed inside the first region and in which correcting the average power has priority over correcting the astigmatism.

7. The spectacle lens design method according to claim 6, wherein the providing the second region includes setting a smaller design diameter of the second region when the prescribed power is negative and as an absolute value of the prescribed power increases.

8. The spectacle lens design method according to claim 6, wherein a provision of the second region includes using an elliptical design shape of the second region when prescriptions of the spectacle lens include astigmatism correction of negative dioptric power.

9. A spectacle lens design apparatus comprising:
   a unit that acquires eyeglass specifications including a prescribed power;
   a first unit that designs a first region which is located in at least a part of a portion of the lens where an angle of torsion of an eyeball of a wearer ranges from 20 to 60 degrees and in which correcting astigmatism has priority over correcting average power based on the prescribed power; and
   a second unit that designs a second region which is located inside the first region and in which correcting the average power has priority over correcting the astigmatism.

10. The design apparatus according to claim 9, wherein the second unit includes a unit that sets a smaller design diameter of the second region when the prescribed power is negative and as an absolute value of the prescribed power increases, and sets a fixed design diameter of the second region irrespective of the prescribed power when the prescribed power is positive.

* * * * *